United States Patent
Nishibayashi et al.

(10) Patent No.: US 7,990,995 B2
(45) Date of Patent: Aug. 2, 2011

(54) WIRELESS COMMUNICATION APPARATUS AND WIRELESS COMMUNICATION METHOD

(75) Inventors: Yasuyuki Nishibayashi, Kawasaki (JP); Masahiro Takagi, Tokyo (JP); Tomoko Adachi, Urayasu (JP); Tomoya Tandai, Tokyo (JP); Tetsu Nakajima, Yokohama (JP); Yoriko Utsunomiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 965 days.

(21) Appl. No.: 11/137,588

(22) Filed: May 26, 2005

(65) Prior Publication Data

US 2005/0265302 A1 Dec. 1, 2005

(30) Foreign Application Priority Data

May 28, 2004 (JP) ................................. 2004-160261

(51) Int. Cl.
 *H04J 3/16* (2006.01)
(52) U.S. Cl. .......................... 370/435; 370/445; 370/394
(58) Field of Classification Search .................. 370/535, 370/338, 412, 395.1, 413, 473, 394, 465, 370/474, 476
 See application file for complete search history.

(56) References Cited

U.S. PATENT DOCUMENTS

| | | | |
|---|---|---|---|
| 5,329,531 A | 7/1994 | Diepstraten et al. | |
| 6,570,883 B1 | 5/2003 | Wong | |
| 6,771,653 B1 * | 8/2004 | Le Pennec et al. | 370/412 |
| 6,934,752 B1 * | 8/2005 | Gubbi | 709/225 |
| 7,304,945 B1 * | 12/2007 | Vishnu | 370/230 |
| 7,317,687 B2 * | 1/2008 | Del Prado Pavon et al. | 370/235 |
| 7,433,314 B2 * | 10/2008 | Sharma et al. | 370/236 |
| 2002/0032788 A1 | 3/2002 | Emanuel et al. | |
| 2003/0169769 A1 * | 9/2003 | Ho et al. | 370/473 |
| 2003/0185249 A1 * | 10/2003 | Davies et al. | 370/535 |
| 2004/0002357 A1 * | 1/2004 | Benveniste | 455/550.1 |
| 2005/0157715 A1 * | 7/2005 | Hiddink et al. | 370/389 |
| 2005/0216822 A1 * | 9/2005 | Kyusojin et al. | 715/501.1 |
| 2007/0058665 A1 * | 3/2007 | Ho et al. | 370/447 |

FOREIGN PATENT DOCUMENTS

| | | |
|---|---|---|
| CN | 1330359 A | 1/2002 |
| EP | 1589704 A2 | 10/2005 |
| EP | 1589704 A3 | 10/2005 |
| JP | 2002-314546 | 10/2002 |
| JP | 2003-324442 | 11/2003 |

(Continued)

OTHER PUBLICATIONS

U.S. Appl. No. 11/087,763, filed Mar. 24, 2005, Yasuyuki Nishibayashi, et al.

(Continued)

*Primary Examiner* — Patrick Edouard
*Assistant Examiner* — Julio Perez
(74) *Attorney, Agent, or Firm* — Oblon, Spivak, McClelland, Maier & Neustadt, L.L.P.

(57) ABSTRACT

A wireless communication apparatus includes a main queue to store MAC frames, a plurality of subqueues related to the main queue and used to control retransmission of the MAC frame, each of the subqueues having different priority for transmission of the MAC frame, respectively, an extracting device configured to extract the MAC frame from the main queue on the basis of a destination and the priority, and distribute the extracted MAC frame to one of the plurality of subqueues for each priority, and an aggregating device configured to extract MAC frames from the plurality of subqueues to form a MAC super frame.

17 Claims, 37 Drawing Sheets

FOREIGN PATENT DOCUMENTS

JP            2004-7336        1/2004

OTHER PUBLICATIONS

U.S. Appl. No. 11/110,936, filed Apr. 21, 2005, Yasuyuki Nishibayashi, et al.
U.S. Appl. No. 11/029,544.
U.S. Appl. No. 11/200,103, filed Aug. 10, 2005, Nishibayashi, et al.
U.S. Appl. No. 11/201,258, filed Aug. 11, 2005, Nishibayashi, et al.
U.S. Appl. No. 11/201,198, filed Aug. 11, 2005, Nishibayashi, et al.
U.S. Appl. No. 11/853,437, filed Sep. 11, 2007, Hirano, et al.
U.S. Appl. No. 11/525,994, filed Sep. 25, 2006, Nishibayashi, et al.
U.S. Appl. No. 12/054,945, filed Mar. 25, 2008, Nishibayashi, et al.
Jean Lorchat, et al., "Energy Saving in IEEE 802.11 Communications using Frame Aggregation", Globecom '03. 2003-IEEE Global Telecommunications Conference. Conference Proceedings. San Francisco, CA, Dec. 1-5, 2003, vol. 3, XP010677504, Dec. 1, 2003, pp. 1296-1300.
Qos Mechanic in an IEEE 802.11 wireless local area network, dated Aug. 2002.

\* cited by examiner

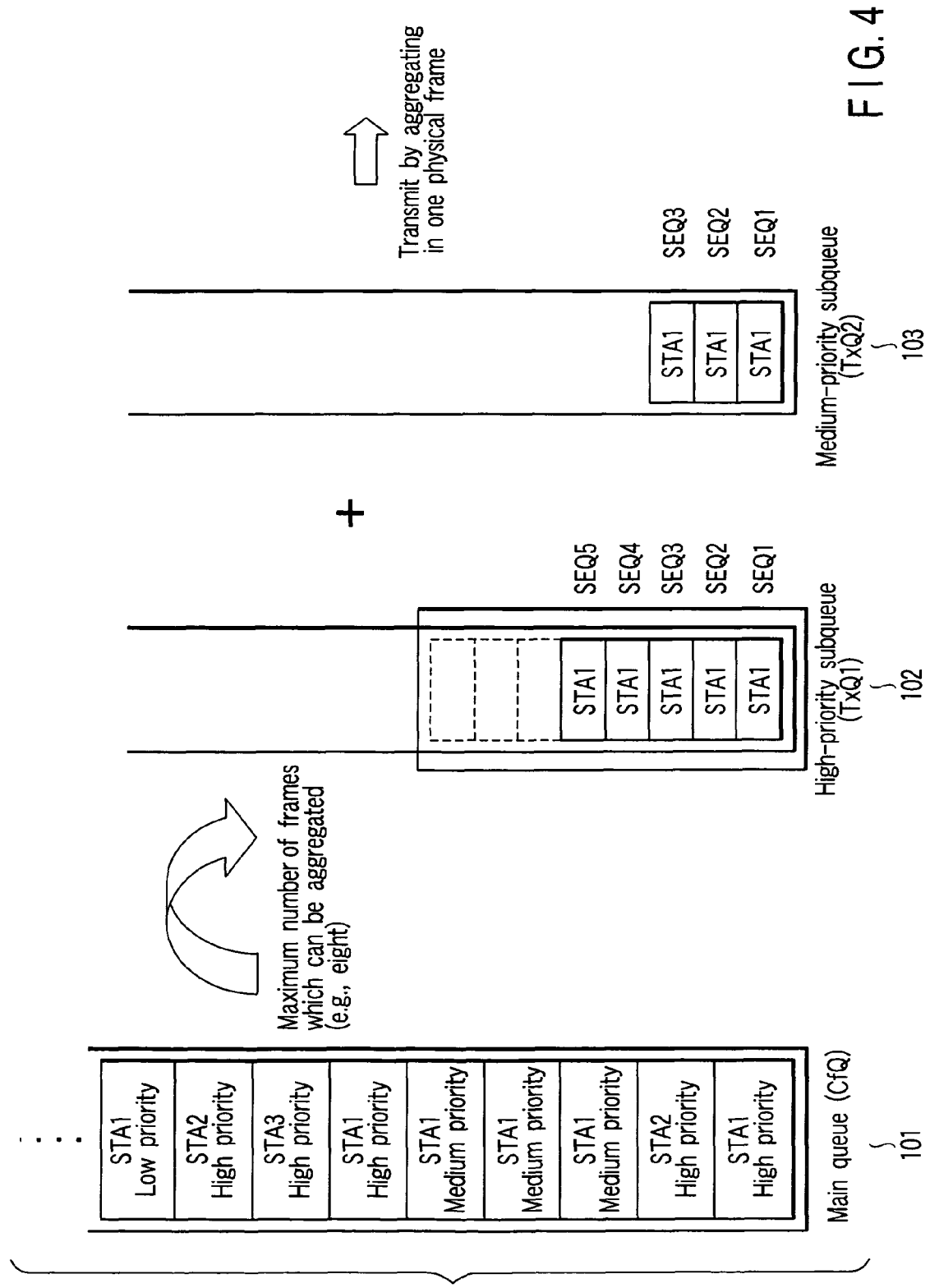
F I G. 4

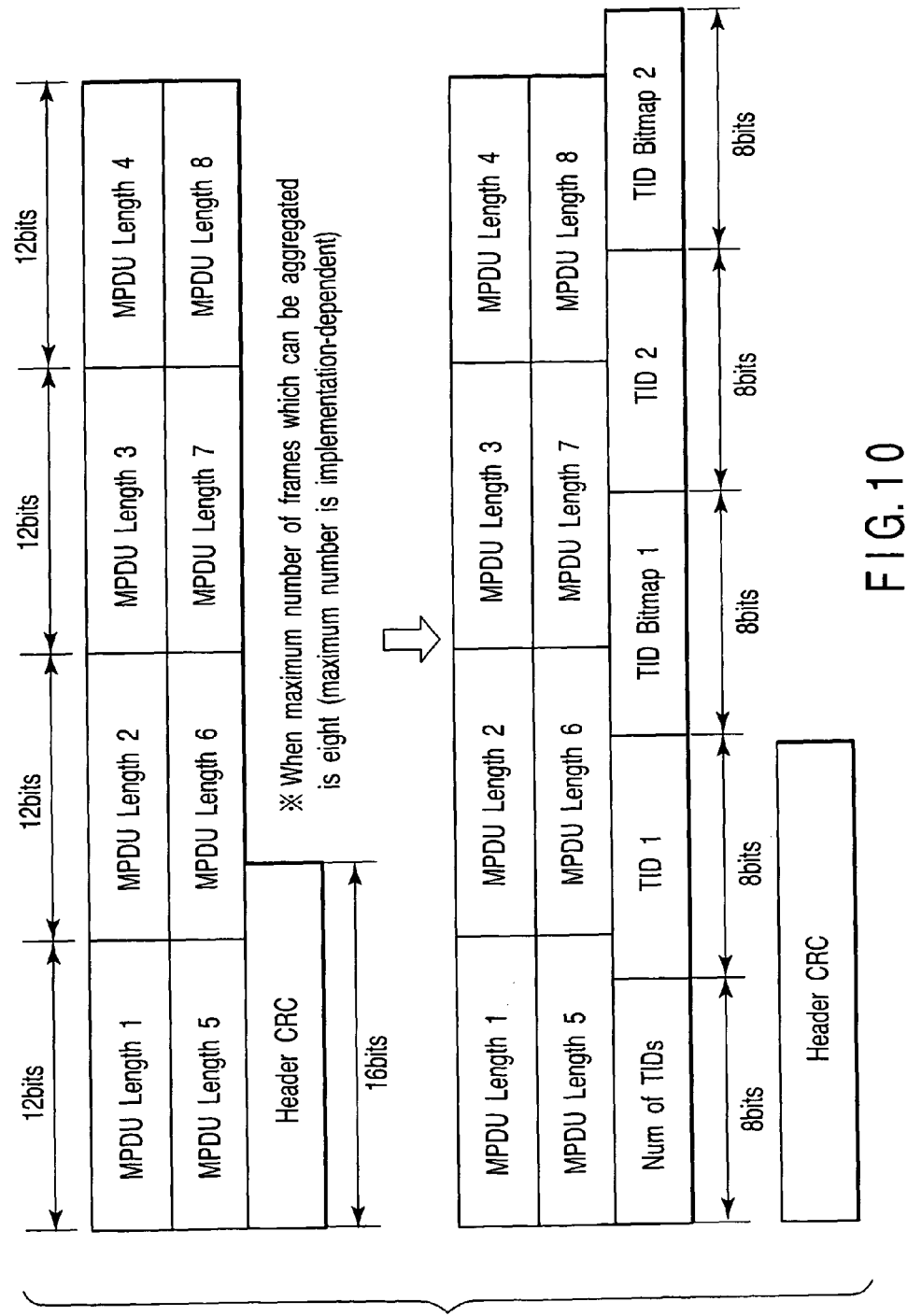
F I G. 10

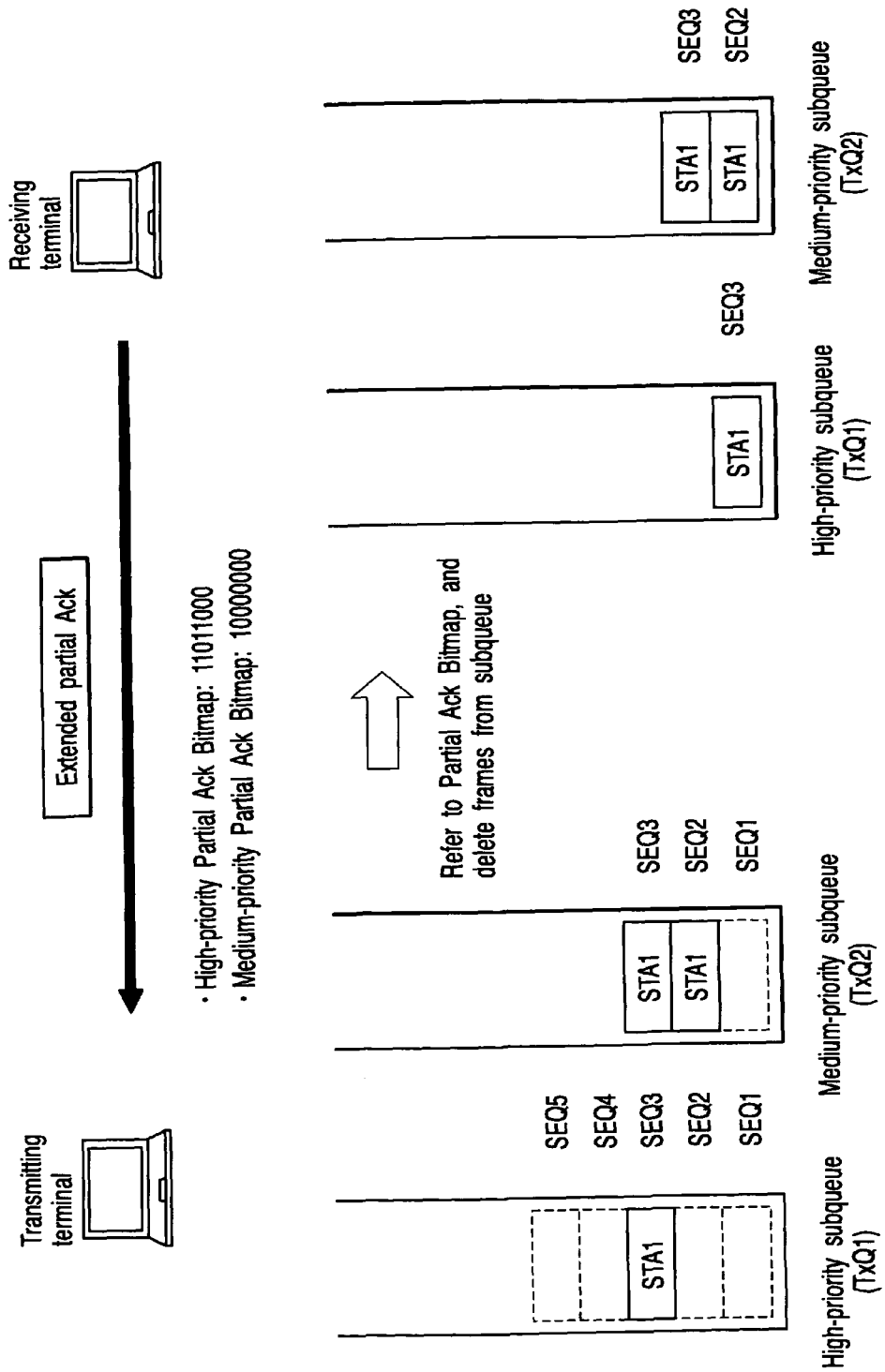
F I G. 15

FIG. 16

Example 2 of sliding window control for plural priorities

| Seq. (High) | Sesq. (Medium) | W_all | W1 (High) | TX1 (High) | TX1 (Medium) | RX1 (High) | RX1 (Medium) | W2 (High) | TX2 (High) | W2 (Medium) | TX2 (Medium) |
|---|---|---|---|---|---|---|---|---|---|---|---|
| 1 | | Start | Start | Len1 | | | | | | | |
| 2 | | | | Len2 | | ○ | | | | | |
| 3 | | | | Len3 | | × | | Start | Len2 | | |
| 4 | | | | Len4 | | ○ | | | Zero | | |
| 5 | | | | Len5 | | ○ | ○ | | Zero | | |
| | 1 | | | Null | Start | ○ | ○ | | Zero | | |
| | 2 | | | Null | Len2 | | ○ | | Null | | |
| | 3 | | | Null | Len3 | | | | Null | | |
| | 4 | | | | End | | | End | Null | | |
| | 5 | | | | | | | | Null | Start | Len4 |
| | 6 | | | | | | | | | | Len5 |
| | 7 | | | | | | | | | End | Len6 |
| | | End | | | | | | | | | Len7 |

FIG. 17

Example 3 of sliding window control when receiving side has buffer for each priority

| Seq. No. | W_all | W1 (High) | W1 (Medium) | TX1 (High) | TX1 (Medium) | RX1 (High) | RX1 (Medium) | W2 (High) | W2 (Medium) | TX2 (High) | TX2 (Medium) |
|---|---|---|---|---|---|---|---|---|---|---|---|
| 1 | Start | Start | Start | Len1 | Len1 | ○ | × |  | Start |  | Len1 |
| 2 |  |  |  | Len2 | Len2 | ○ | ○ |  |  |  | Zero |
| 3 |  |  |  | Len3 | Len3 | ○ | ○ |  |  |  | Zero |
| 4 |  |  |  | Len4 | NoAdd | ○ |  |  |  |  | NoAdd |
| 5 |  |  |  | Len5 | NoAdd |  |  |  |  |  | NoAdd |
| 6 |  |  | End | Null | NoAdd |  |  | Start | End | Len6 | NoAdd |
| 7 |  |  |  | Null |  |  |  |  |  | Len7 |  |
| 8 |  | End |  | Null |  |  |  |  |  | Len8 |  |
| 9 |  |  |  |  |  |  |  |  |  | Len9 |  |
| 10 |  |  |  |  |  |  |  |  |  | Len10 |  |
| 11 |  |  |  |  |  |  |  |  |  | Len11 |  |
| 12 |  |  |  |  |  |  |  |  |  | Len12 |  |
| 13 |  |  |  |  |  |  |  | End |  | NoAdd |  |
| 14 |  |  |  |  |  |  |  |  |  |  |  |
| 15 |  |  |  |  |  |  |  |  |  |  |  |
| 16 | End |  |  |  |  |  |  |  |  |  |  |

FIG. 18

Example 4 of sliding window control when receiving side has buffer for each priority

| Seq. No. | W_all | W1 (High) | W1 (Medium) | TX1 (High) | TX1 (Medium) | RX1 (High) | RX1 (Medium) | W2 (High) | W2 (Medium) | TX2 (High) | TX2 (Medium) |
|---|---|---|---|---|---|---|---|---|---|---|---|
| 1 | Start | Start | Start | Len1 | Len1 | × | | Start | | Len1 | |
| 2 | | | | Len2 | Len2 | × | ○ | | | Len2 | |
| 3 | | | | Len3 | Len3 | ○ | ○ | | | Zero | |
| 4 | | | | Len4 | NoAdd | ○ | | | Start | Zero | Len4 |
| 5 | | | | Len5 | NoAdd | ○ | | | | Zero | Len5 |
| 6 | | | End | Null | NoAdd | | | | | Null | Len6 |
| 7 | | | | Null | | | | | | Null | Len7 |
| 8 | | End | | Null | | | | End | | Null | Len8 |
| 9 | | | | | | | | | End | | Len9 |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | End | | | | | | | | | | |

FIG.19

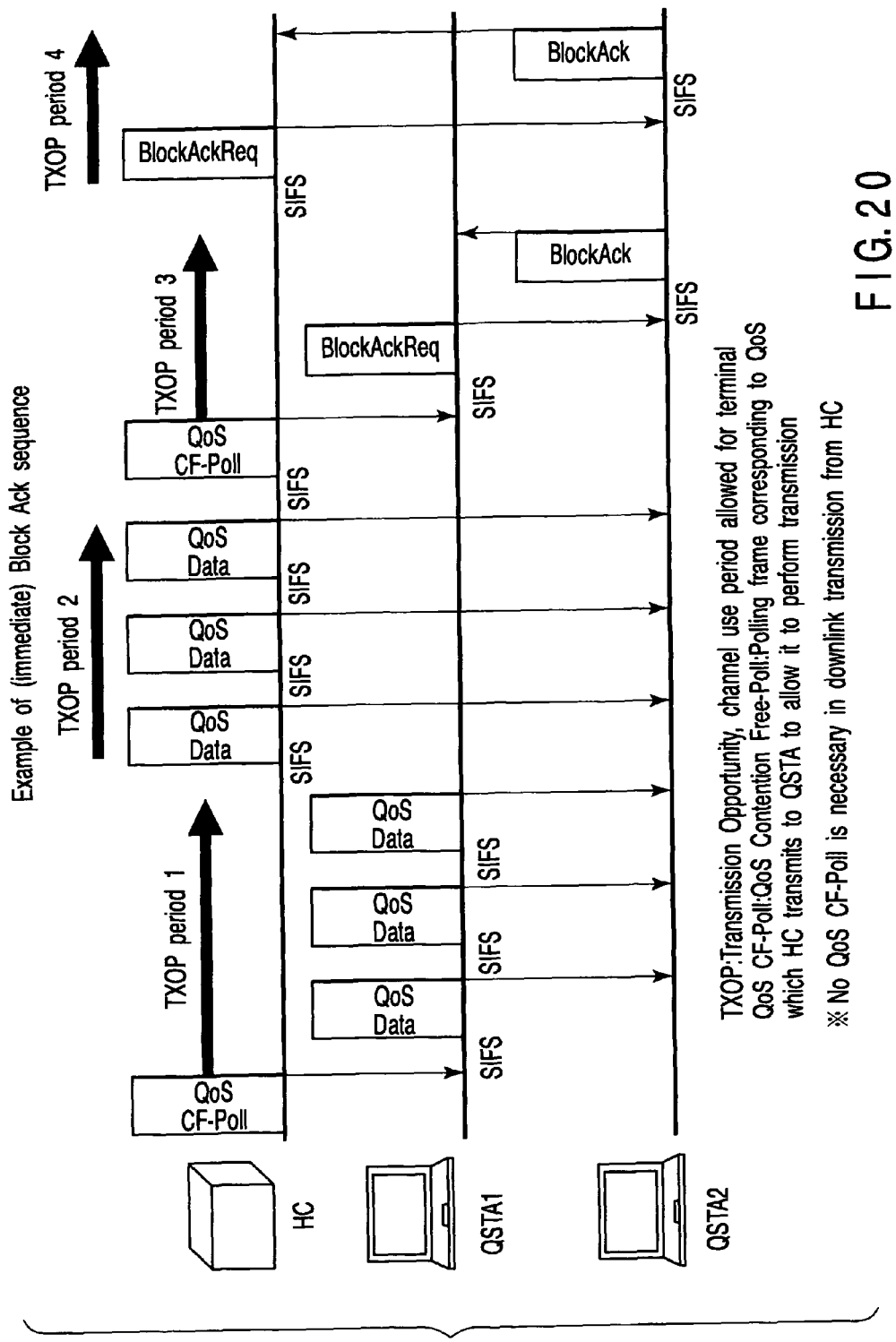
F I G. 2 0

| Priority | User priority (UP-Same as 802.1D User Priority) | 802.1D Designation | Access Category (AC) | Designation (Informative) |
|---|---|---|---|---|
| lowest | 1 | BK | AC_BK | Background |
| | 2 | - | AC_BK | Background |
| | 0 | BE | AC_BE | Best Effort |
| | 3 | EE | AC_BE | Best Effort |
| | 4 | CL | AC_VI | Video |
| | 5 | VI | AC_VI | Video |
| | 6 | VO | AC_VO | Voice |
| highest | 7 | NC | AC_VO | Voice |

FIG. 34

WIRELESS COMMUNICATION APPARATUS AND WIRELESS COMMUNICATION METHOD

CROSS-REFERENCE TO RELATED APPLICATIONS

This application is based upon and claims the benefit of priority from prior Japanese Patent Application No. 2004-160261, filed May 28, 2004, the entire contents of which are incorporated herein by reference.

BACKGROUND OF THE INVENTION

1. Field of the Invention

The present invention relates to a wireless communication apparatus which performs media access control and, more particularly, to access control for improving Quality of Service (QoS).

2. Description of the Related Art

MAC (Media Access Control) is control for causing a plurality of communication apparatuses which perform communication while sharing the same medium to decide how to use the medium in transmitting communication data. Owing to media access control, even if two or more communication apparatuses transmit communication data by using the same medium at the same time, there is less chance of the occurrence of a phenomenon (collision) in which a communication apparatus on the receiving side cannot decode communication data. Media access control is also a technique for controlling access from communication apparatuses to a medium so as to minimize the chance of the occurrence of a phenomenon in which, despite the presence of communication apparatuses having transmission requests, the medium is not used by any of the communication apparatuses.

In addition, several access control techniques designed to improve Quality of Service (QoS) are also known. For example, there is available HCCA (HCF Controlled Channel Access) which is an extended technique of a conventional polling sequence and is used as a QoS technique of guaranteeing parameters such as a designated bandwidth and delay time. In HCCA, scheduling is performed in consideration of required quality in the polling sequence so as to guarantee parameters such as a designated bandwidth and delay time.

Jpn. Pat. Appln. KOKAI Publication No. 2002-314546 discloses a method of assigning priorities to communications between wireless network stations, while referring to QoS in the IEEE 802.11e standard.

An HC according to the IEEE 802.11e contains a scheduling processor which controls transmission of a polling frame to a QSTA and the transmission timings of downlink data. To satisfy the quality of service required by using TS (Traffic Stream) setup from a QSTA, the scheduling processor transmits a polling frame or data for each priority.

If it is necessary to transmit data to a certain QSTA in response to a request from the internal scheduling processor of the HC, it is possible to store a frame in a subqueue for retransmission by using the destination and priority as keys, and transmit the frame as a MAC super frame. It is also possible to store frames addressed to the same destination and having a plurality of priorities into one subqueue, and transmit the frames as a MAC super frame. However, this complicates the process of performing sliding window control for each priority by using a Partial Ack response from the destination terminal. In some cases, the internal process ability of the apparatus may decrease.

BRIEF SUMMARY OF THE INVENTION

The present invention has been made in consideration of the above situation, and has as its object to avoid complication of processing and facilitate implementation, when the throughput is to be increased by aggregation of communication frames while the service quality (QoS) of communication is maintained.

A wireless communication apparatus according to an aspect of the present invention includes a main queue to store MAC frames; a plurality of subqueues related to the main queue and used to control retransmission of the MAC frame, each of the subqueues having different priority for transmission of the MAC frame, respectively; an extracting device configured to extract the MAC frame from the main queue on the basis of a destination and the priority, and distribute the extracted MAC frame to one of the plurality of subqueues for each priority; and an aggregating device configured to extract MAC frames from the plurality of subqueues to form a MAC super frame.

BRIEF DESCRIPTION OF THE SEVERAL VIEWS OF THE DRAWING

FIG. 4 is a view showing a subqueue for each priority according to an embodiment of the present invention;

FIG. 10 is a view showing addition of "TID Bitmap";

FIG. 15 is a view showing frame deletion from priority subqueues;

FIG. 16 is a view showing an example of sliding window control for a plurality of priorities according to an embodiment of the present invention;

FIG. 17 is a view showing another example of the sliding window control for a plurality of priorities;

FIG. 18 is a view showing an example of sliding window control when the receiving side has a buffer for each priority;

FIG. 19 is a view showing another example of the sliding window control when the receiving side has a buffer for each priority;

FIG. 20 is a view showing an example of (immediate) Block Ack sequence;

FIG. 34 is a view showing mapping of AC and User Priority;

DETAILED DESCRIPTION OF THE INVENTION

Embodiments of the present invention will be described below with reference to the accompanying drawing.

A wireless communication apparatus according to an embodiment of the present invention communicates with another communication apparatus via wireless links, and has processing units corresponding to a physical layer, MAC layer, and link layer. These processing units are implemented as analog or digital electronic circuits or as firmware or the like executed by a CPU incorporated into an LSI, in accordance with implementation requirements. An antenna is connected to the processing unit of the physical layer. The processing unit of the MAC layer has an aggregation processor. This aggregation processor includes a carrier sense controller, retransmission controller, and scheduling controller.

Figure 1:
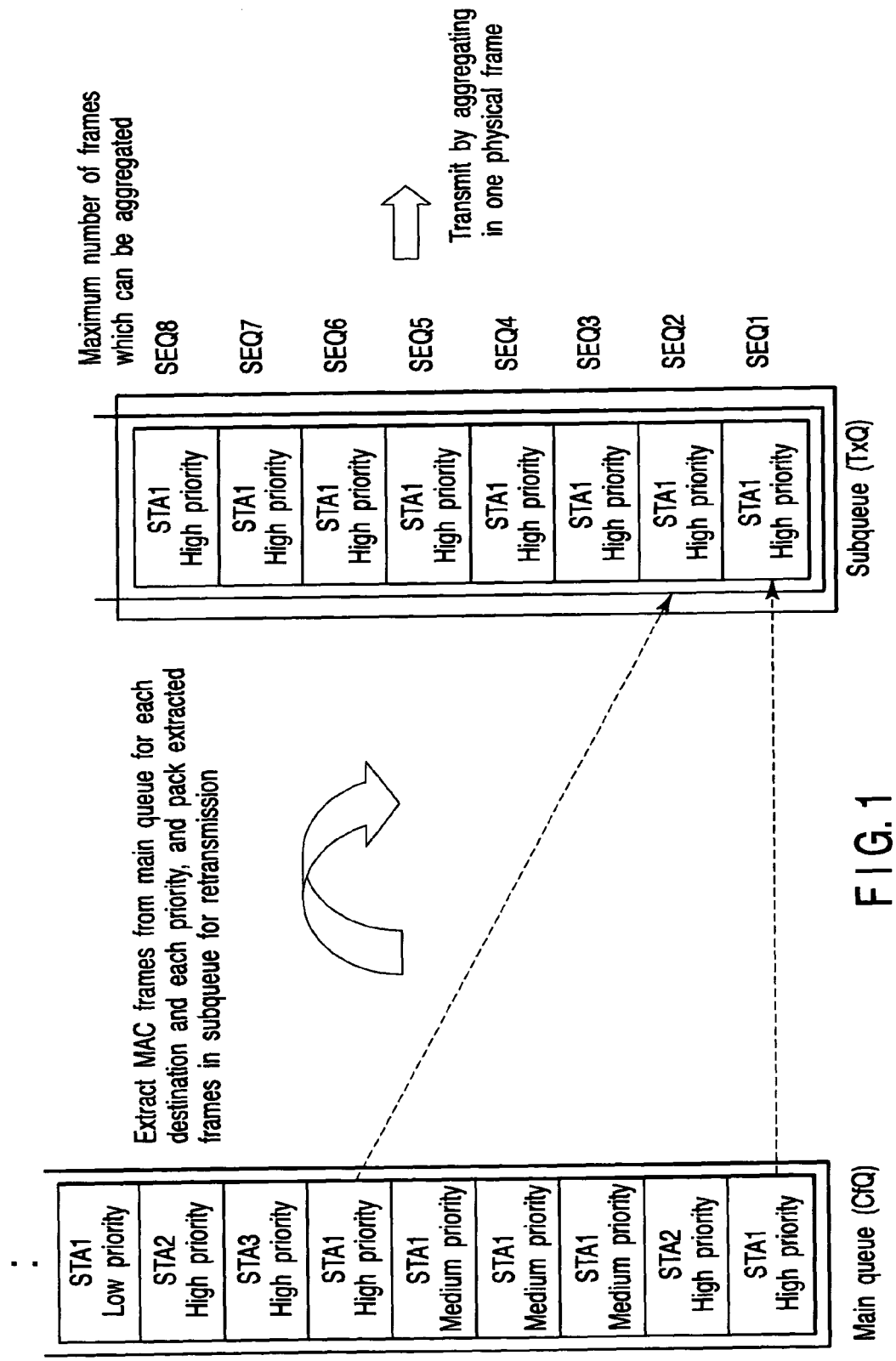
FIG. 1 is a view showing the conventional queue configuration.

First Embodiment 1-1. Frame Aggregation Implementation (Subqueue for Each Priority) in HCCA When MAC frame aggregation is to be performed while HCCA (HCF Controlled Channel Access) of the IEEE 802.11e is used, a queue configuration is as shown in FIG. 1 if only one subqueue for retransmission is present. Referring to FIG. 1, CfQ (Contention free Queue) is a main queue for storing downlink data from a QoS access point (HC: Hybrid Coordinator) to a QoS terminal (QSTA: QoS Station) or uplink data from the QSTA to the HC, which can be transmitted during a frame transmission period. MAC frames having various destinations and priorities are present.

Figure 2:
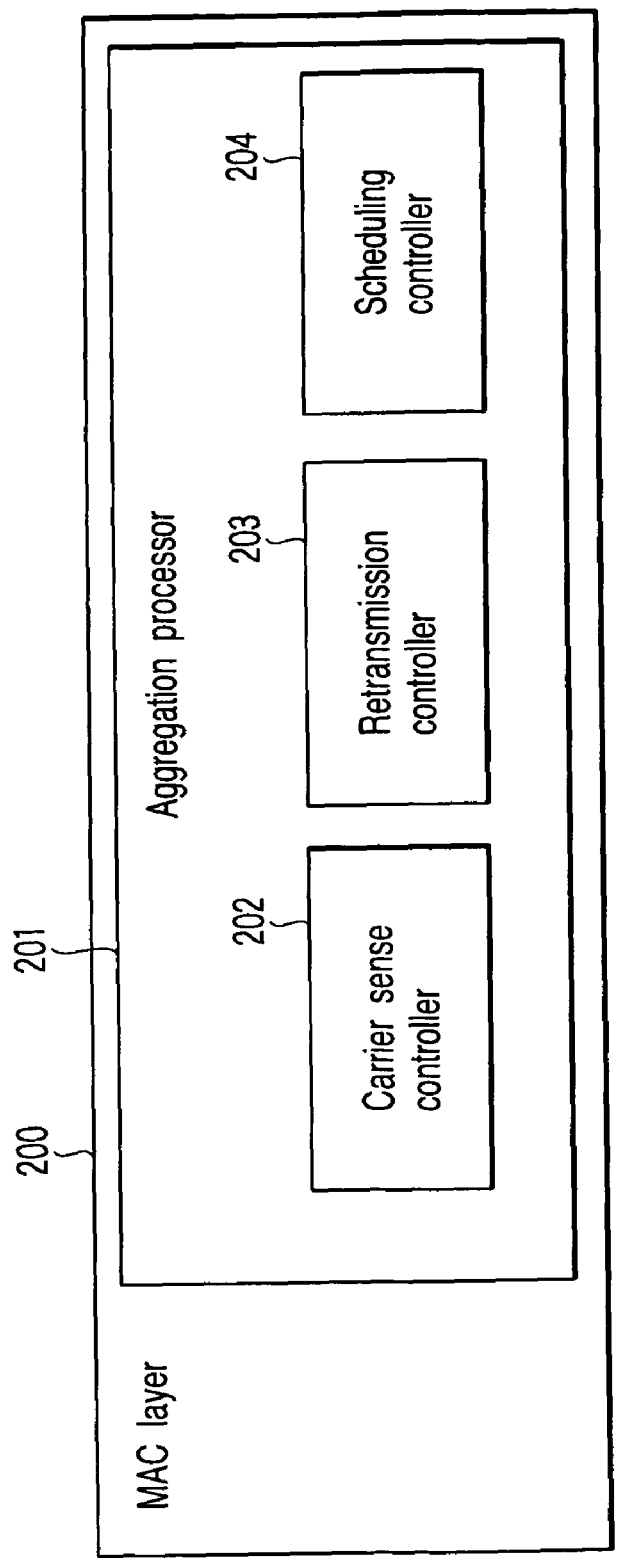
FIG. 2 is a block diagram showing the apparatus configuration (MAC layer) of an HC.

FIG. 2 is a block diagram showing the apparatus configuration (MAC layer) of an HC. As shown in FIG. 2, an aggregation processor 201 has a carrier sense controller 202, a retransmission controller 203, and a scheduling controller 204. A carrier sense controller 202 performs media access control on the basis of the carrier sense information of a physical layer and a virtual carrier sense information of a MAC layer. A retransmission controller 203 performs transmission/reception of partial acknowledgement frames, retransmission control based on partial acknowledgement frames, and the like. A scheduling controller 204 which controls transmission of a polling frame to a QSTA and the transmission timings of downlink data is present in the HC of the IEEE 802.11e. This scheduling controller 204 transmits a polling frame or data for each priority so as to satisfy the quality of service required by using TS (Traffic Stream) setup from a QSTA. The priority parameter specifies the priority desired for the MAC frame unit transfer.

Figure 3:
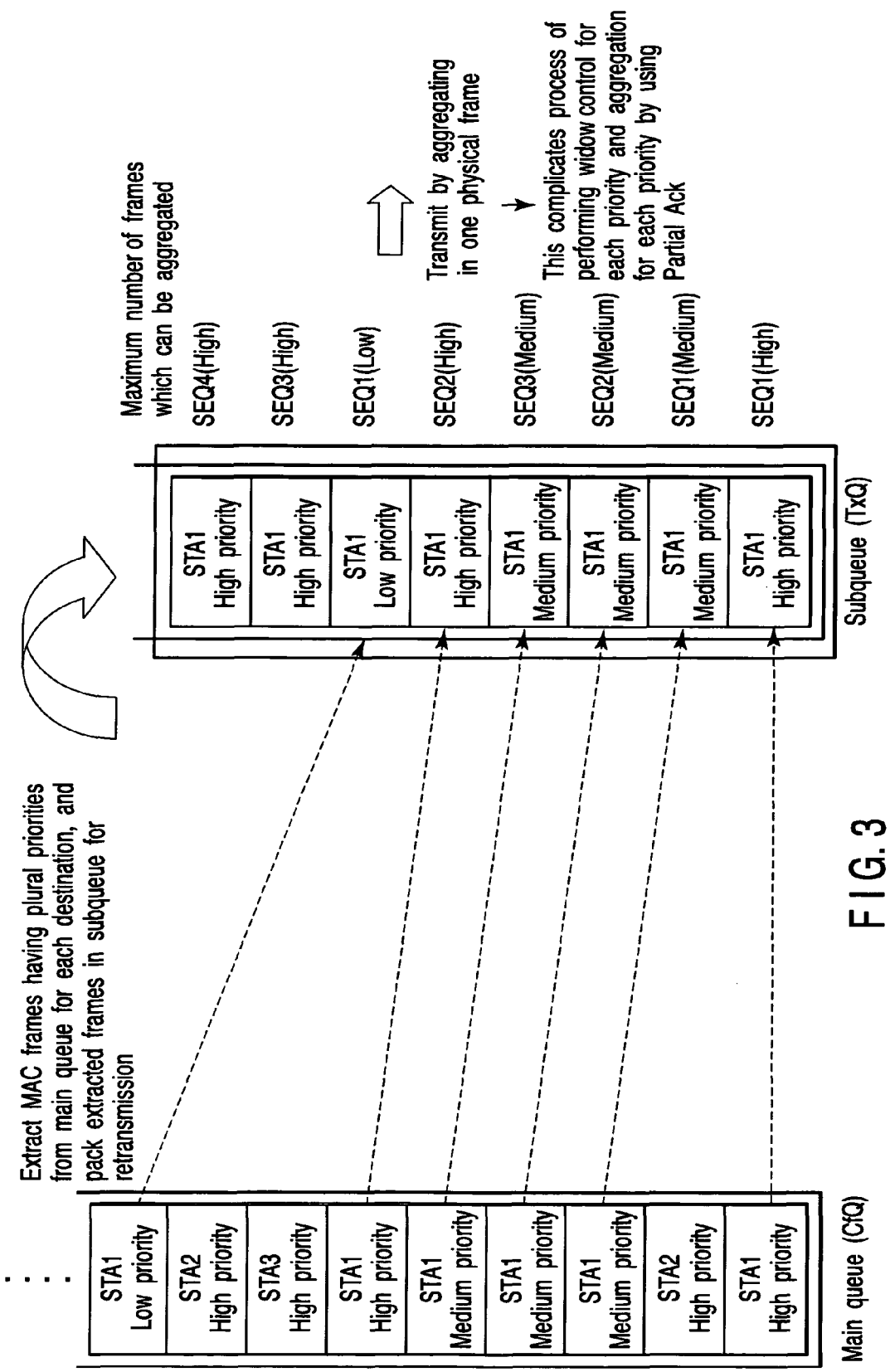
FIG. 3 is a view showing a subqueue and a plurality of priority frames.

If it is necessary to transmit data to a certain QSTA in response to a request from the internal scheduling processor of the HC, as shown in FIG. 1, it is possible to store a frame in a subqueue for retransmission by using the destination and priority as keys, and transmit the frame as a MAC super frame. As shown in FIG. 3, it is also possible to store frames addressed to the same destination and having a plurality of priorities into one subqueue, and transmit the frames as a MAC super frame. However, this complicates the process of performing sliding window control for each priority by using a Partial Ack response from the destination terminal. In some cases, the internal process ability of the apparatus may decrease.

In this embodiment, therefore, as shown in FIG. 4, a plurality of retransmission control subqueues 102, 103 are prepared in one-to-one correspondence with priorities. This makes it possible to easily realize sliding window control for a plurality of priorities and frame aggregation for each priority, and to perform parallel processing in the communication apparatus. First, if the scheduling controller 204 in the HC generates a request for downlink transmission to a certain priority (high priority in the example shown in FIG. 4) of a certain destination (STA1 in the example shown in FIG. 4), the aggregation processor 201 extracts, from a main queue 101, frames having the destination and priority corresponding to the request, and stores them in subqueues 102, 103 prepared for the priority. The number of MPDUs (MAC Protocol Data Unit) which can be aggregated in one MAC super frame is predetermined by negotiation. In the example shown in FIG. 4, the upper limit is eight. Note that the method of negotiation is not limited to any specific method.

As in the example shown in FIG. 4, when high-priority frames are to be transmitted to STA1 by downlink transmission, if the number of frames stored in the high-priority subqueue 102 is less than the maximum number of frames which can be aggregated in one MAC super frame, MAC frames addressed to the same destination and having a different priority are stored in a corresponding subqueue. In the example shown in FIG. 4, only five high-priority frames requested by the scheduling processor are stored in the subqueue although the maximum number of frames which can be aggregated is eight, so three medium-priority frames are stored in a medium-priority subqueue 103. As shown in FIG. 4, sequence numbers are assigned to each priority in accordance with the IEEE 802.11e standard. The request from the internal scheduling processor of the HC can be generated by any of a method using "destination, priority" (MAC frames are extracted from the main queue until the maximum number of frames which can be aggregated in a MAC super frame is reached), a method using "destination, priority, the number of frames" (the scheduling processor designates the number of MAC frames to be extracted from the main queue), and a method using "destination, priority 1, the number of frames of priority 1, priority 2, the number of frames of priority 2" (the scheduling processor designates transmission of a plurality of priorities and the numbers of frames of these priorities). However, frames are stored in a subqueue for each priority in the same manner as in FIG. 4 regardless of the method.

Figure 5:
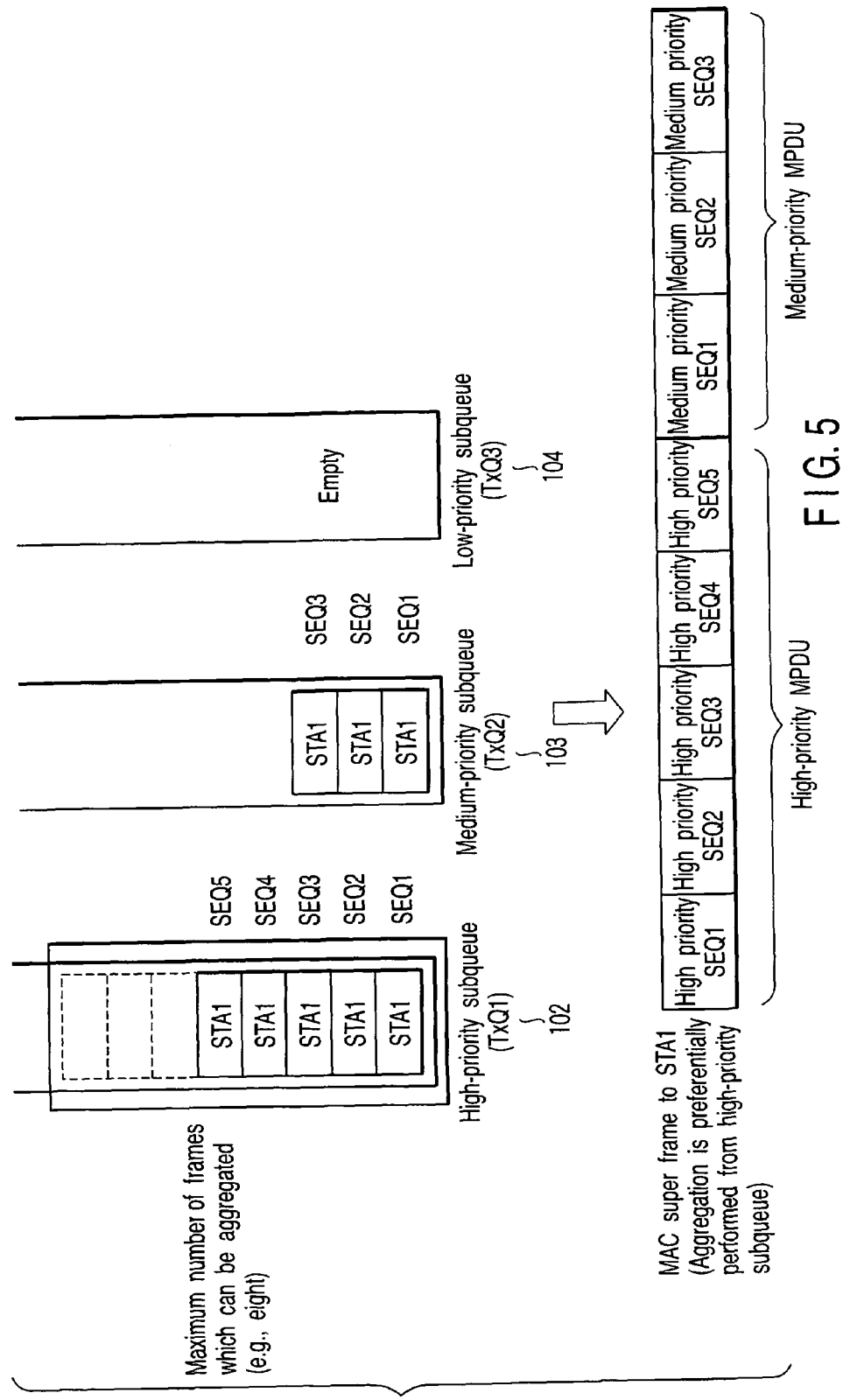
FIG. 5 is a view for explaining the formation of a MAC super frame.

When a MAC super frame is to be actually formed, MAC frames are extracted preferentially from a subqueue having a high priority, and aggregated from the front of the MAC super frame. Assume in an example shown in FIG. 5 that five MAC frames are stored in a high-priority subqueue 102 and three MAC frames are stored in a medium-priority subqueue 103. The total of these frames is equal to the maximum number (in the example shown in FIG. 5, eight) of frames which can be stored in one MAC super frame. However, if no frame having the corresponding destination and priority exists in the main queue, the number of frames can be smaller than the maximum number of frames which can be aggregated. Also, if only two medium-priority MAC frames exist in the main queue in the case shown in FIG. 5, low-priority frames are stored in a low-priority subqueue 104, and aggregated in the rear of the MAC super frame. Frames are aggregated for each priority in order to protect high-priority MPDUs because the longer a physical frame, the lower the channel estimation accuracy in the latter half of the frame, and the more easily an error occurs.

Note that this embodiment is applicable not only to downlink traffic transmission from an HC but also to uplink traffic transmission from a QSTA.

Figure 6:
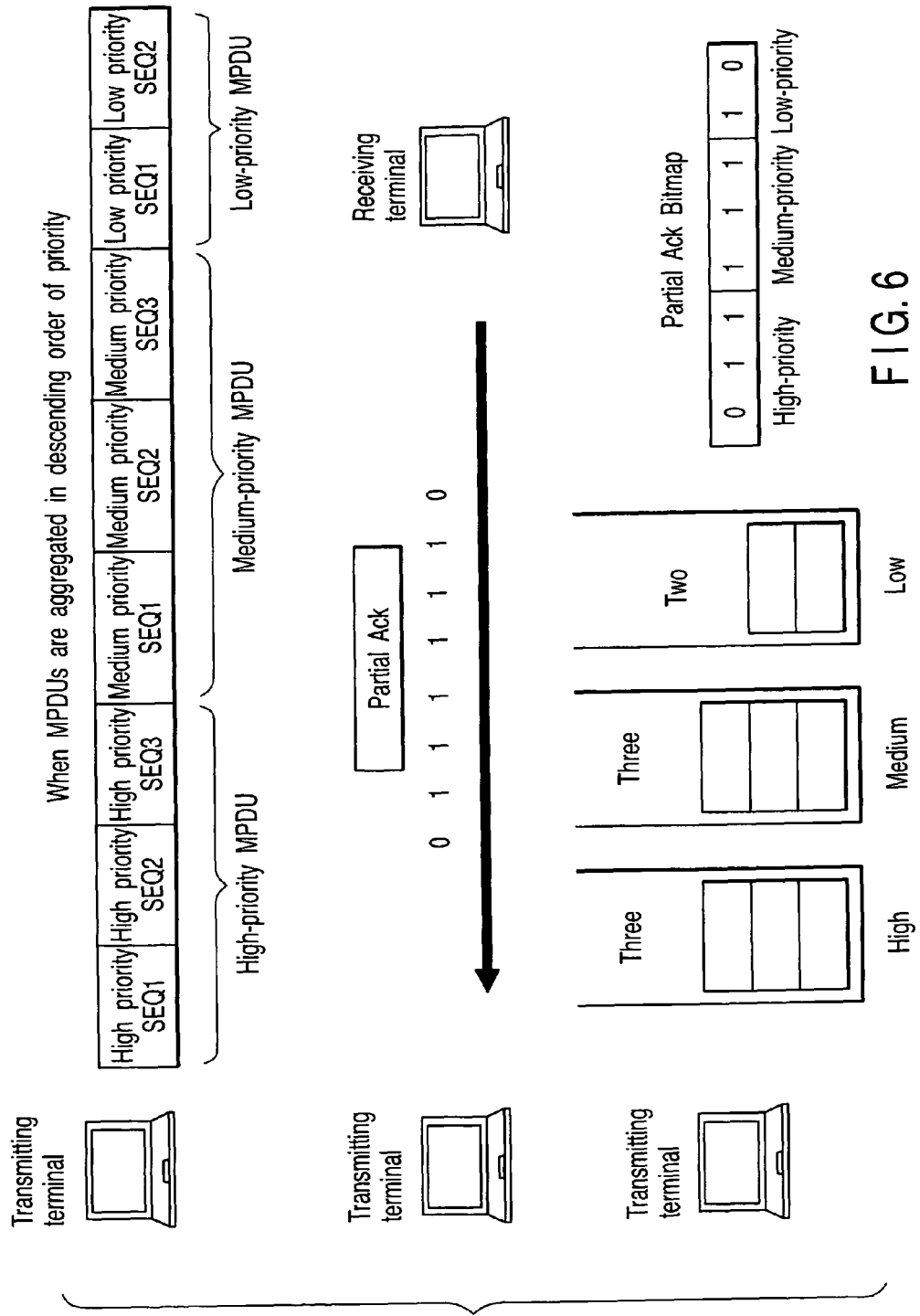
FIG. 6 is a view showing a case in which the priority order is known beforehand.

Second Embodiment 1-2. Frame Aggregation Implementation (Partial Ack Bitmap for Each Priority) in HCCA A case in which, for MPDUs aggregated for each priority in a MAC super frame, a relative order in which priorities are aggregated is predetermined such that high-priority frames are aggregated first, medium-priority frames are aggregated second, and low-priority frames are aggregated third, and both transmitting and receiving terminals recognize this, will be explained below. As shown in FIG. 6, a MAC super frame receiving terminal describes the reception status of the aggregated MPDUs in a Partial Ack Bitmap, and returns a Partial Ack. In this case, the types and order of the priorities of the aggregated MPDUs have no influence on the formation of the Partial Ack Bitmap. When the Partial Ack is returned to the MAC super frame transmitting terminal, bitmap information for each priority can be determined in the Partial Ack Bitmap from the number of MAC frames stored for retransmission in a subqueue for the priority. By cutting out the transmission status of each priority, sliding window control for each priority can be performed more efficiently.

Figure 7:
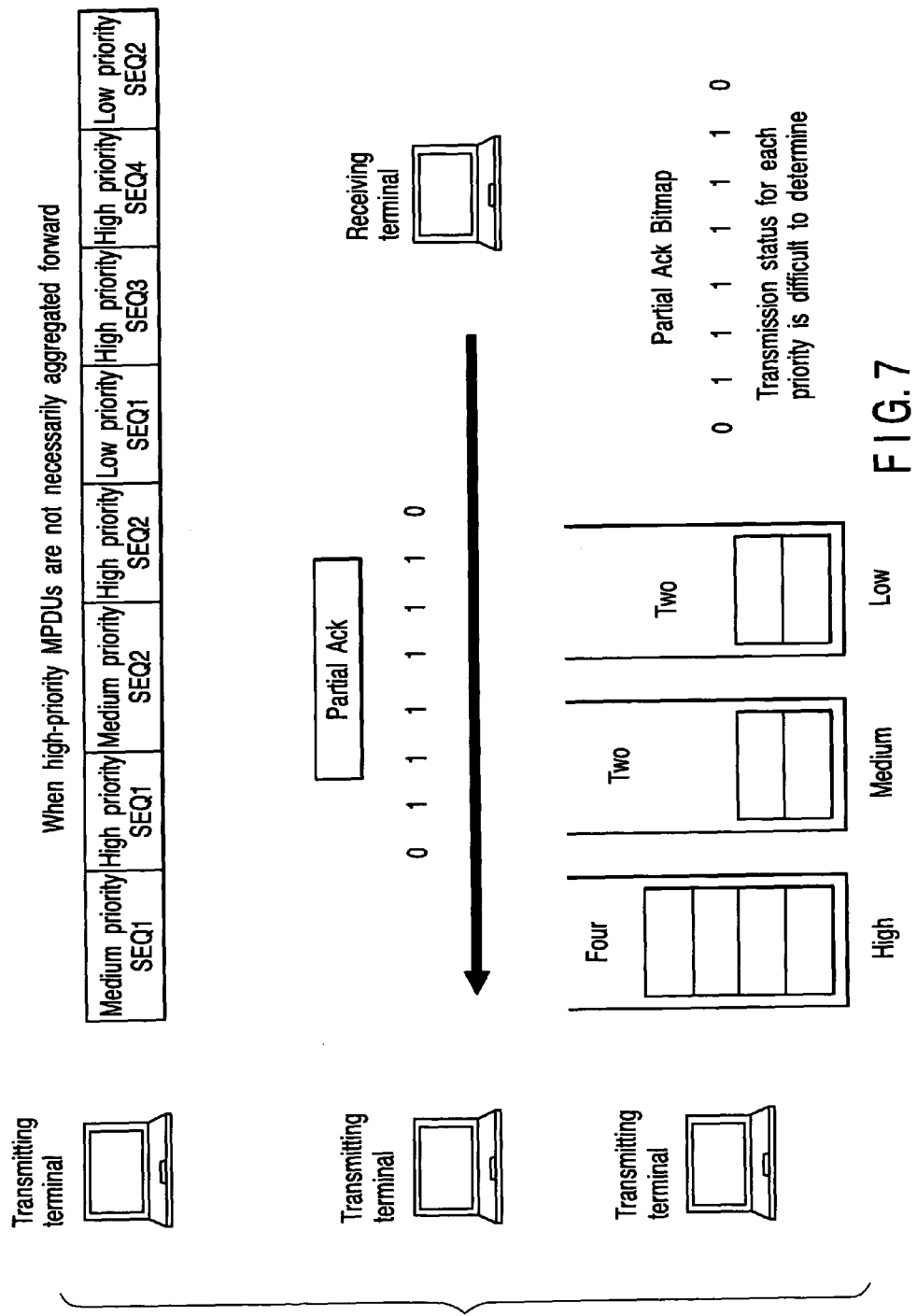
FIG. 7 is a view showing a case in which the priority order is uncertain.
Figure 8:
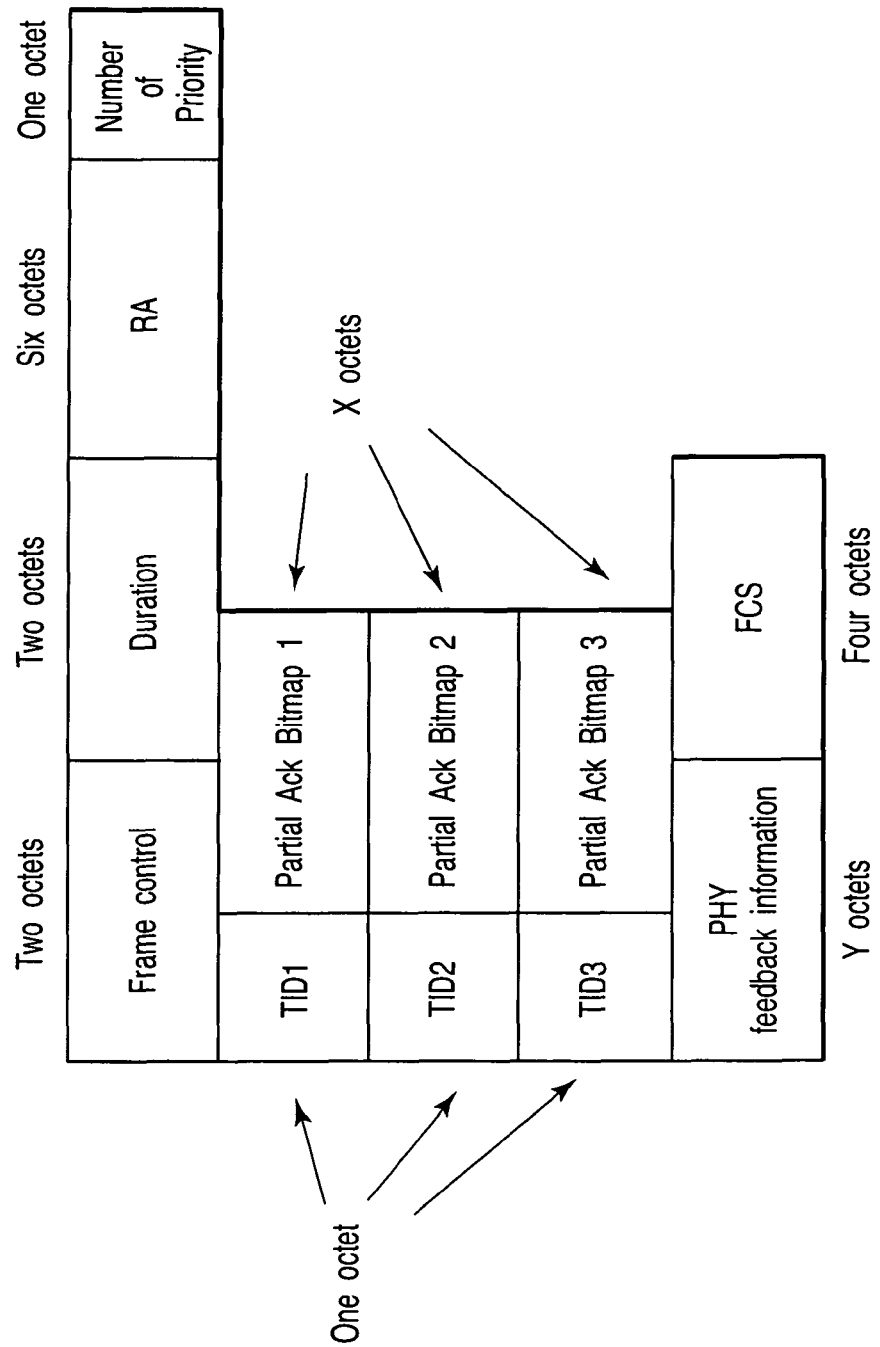
FIG. 8 is a view showing an extended Partial Ack frame.

If, as shown in FIG. 7, MPDUs to be aggregated in a MAC super frame are not necessarily sorted for each priority, it is difficult to immediately determine the transmission status of each priority even when a Partial Ack is received from the destination terminal. To solve this problem, the MAC super frame transmitting side may have cache information which indicates the location of aggregation of each priority. However, it is also possible to prepare a Partial Ack Bitmap for each priority as shown in FIG. 8. An extended Partial Ack frame has a "Number of Priority" field and a Partial Ack Bitmap for each priority. The "Number of Priority" field indicates the number of priorities present in a Partial Ack. A "TID" field corresponds to the value of a TID (Traffic Identifier) of the IEEE 802.11e. As shown in FIG. 8, in the extended Partial Ack frame, a Partial Ack Bitmap is present for each TID. Note that the numbers of the "TID" fields and "Partial Ack Bitmaps" in the Partial Ack frame can be changed in accordance with the number of priorities aggregated in the MAC super frame. FIG. 8 shows a case in which MPDUs having three priorities exist in a MAC super frame. In the example shown in FIG. 8, the maximum number of MPDUs which can be aggregated in the MAC super frame is eight, and the field size of the Partial Ack Bitmap is one octet. However, this size may also be changed in accordance with the maximum number of aggregations.

Figure 9:
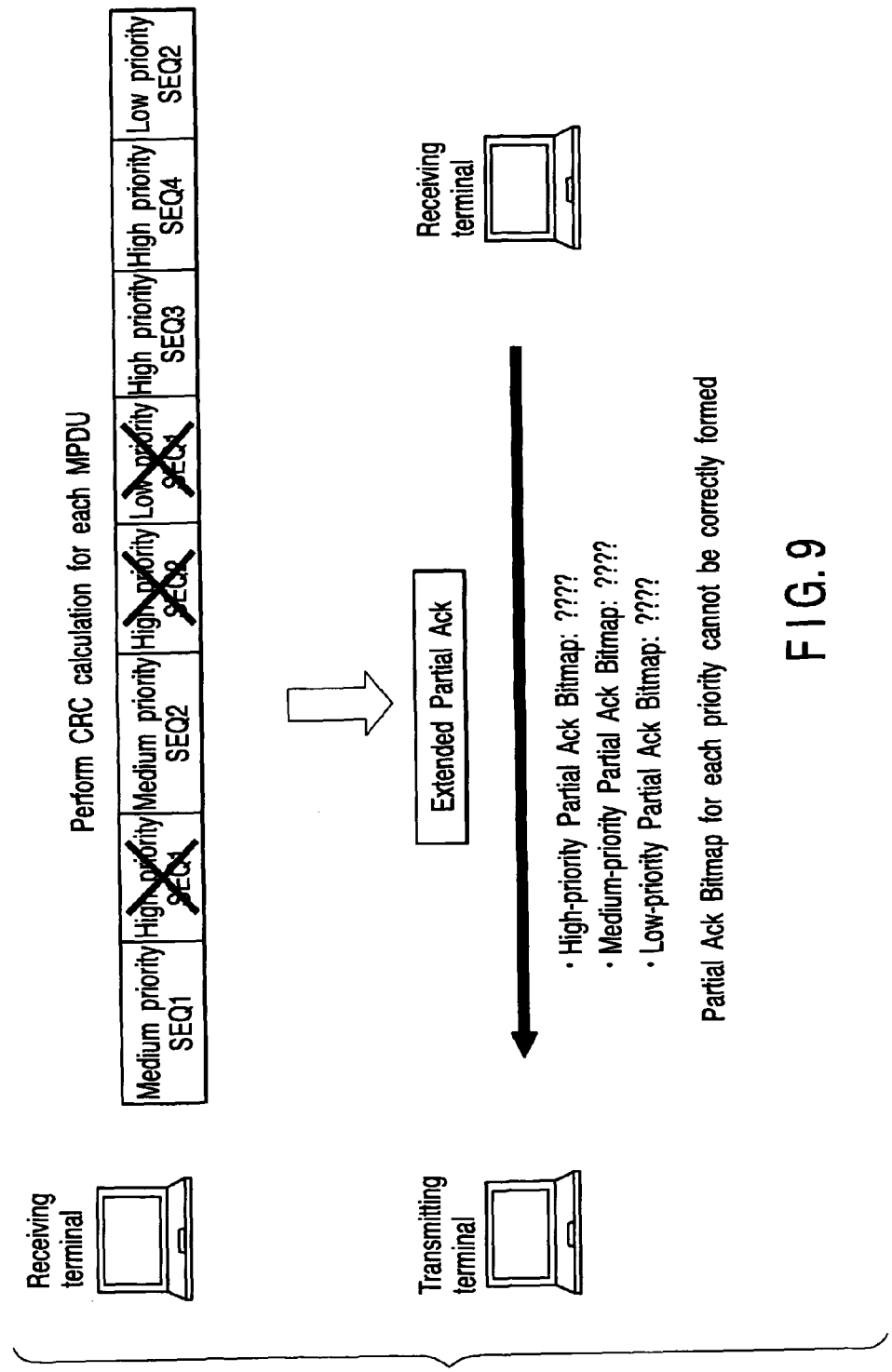
FIG. 9 is a view for explaining CRC errors and determination of priorities.

Assume, as shown in FIG. 9, that MPDUs aggregated in a MAC super frame are found to be errors by CRC calculations. In this case, the MAC super frame receiving side cannot determine the reception status of each priority. As shown in FIG. 10, therefore, a "TID Bitmap" field is newly added to the MAC super frame header. A "Num of TIDs" field indicates the number of priorities aggregated in the MAC super frame. The "TID Bitmap" field follows a "TID" field representing the traffic identifier (the length of this field is one octet, four bits are allocated to the TID, and four remaining bits are allocated to a reservation field). The "TID Bitmap" field is information indicating the position in the MAC super frame in which a frame having the corresponding priority is aggregated. This bitmap information is contained in the MAC super frame header. If a partial MPDU error except for a MAC super frame header CRC error occurs, therefore, the MAC super frame receiving terminal can determine the position where each priority exists and the reception status of the priority.

Figure 11:
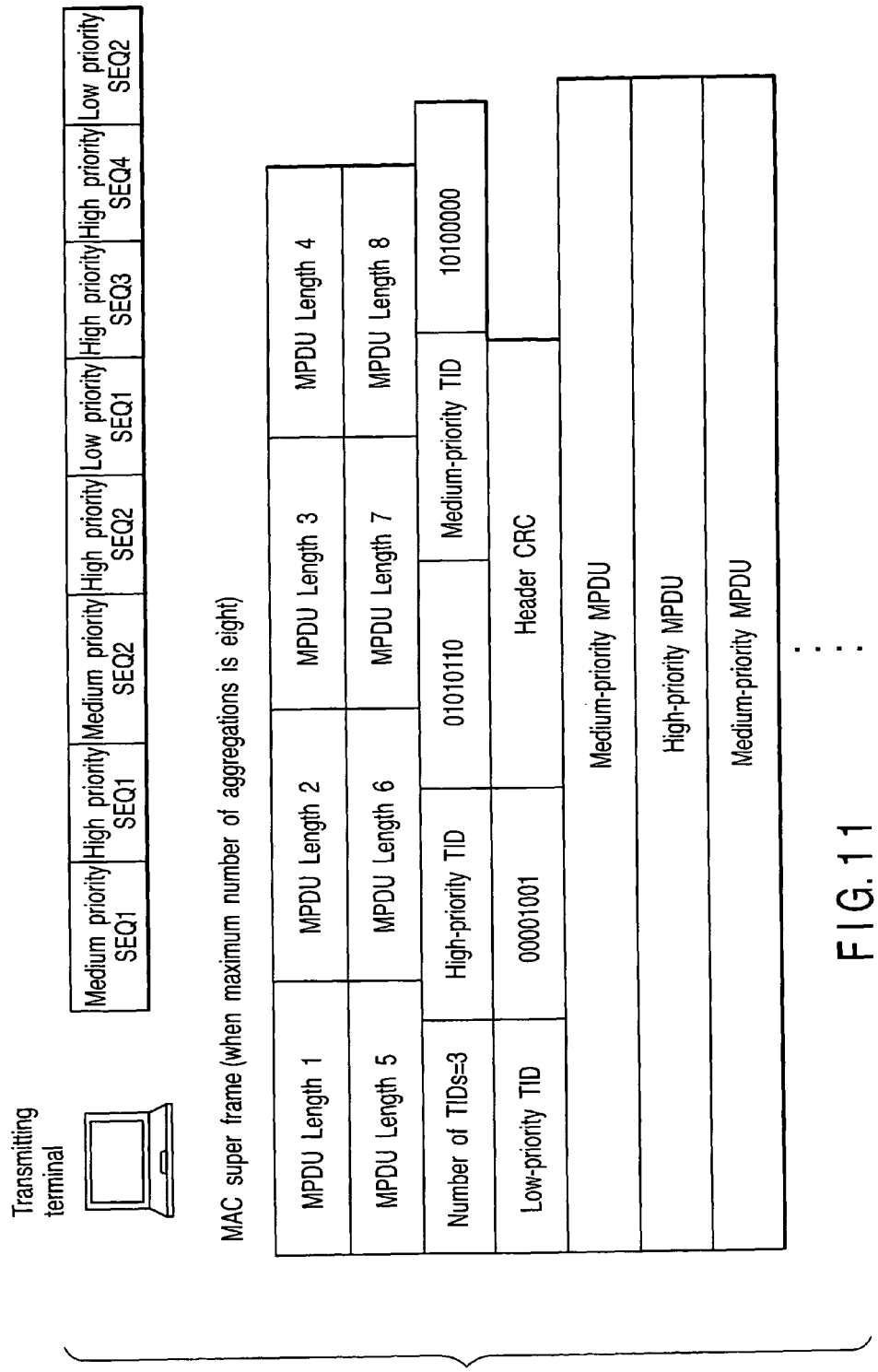
FIG. 11 is a view showing an example of the use of "TID Bitmap"

FIG. 11 shows an example of the use of the "TID Bitmap". Assume, as shown in FIG. 11, that MPDUs having three priorities are aggregated in the order of "medium priority", "high priority", "medium priority", "high priority", "low priority", "high priority", "high priority", and "low priority". Note that the maximum number of MPDUs which can be aggregated is eight in this example shown in FIG. 11; but the maximum number is of course not fixed to this number. In this case, the "TID Bitmap" of the high priority is "01010110", the "TID Bitmap" of the medium priority is "10100000", and the "TID Bitmap" of the low priority is "00001001". That is, the "TID Bitmap" of each priority is identification information which indicates the position in the MAC super frame in which an MPDU corresponding to that priority exists.

Figure 12:
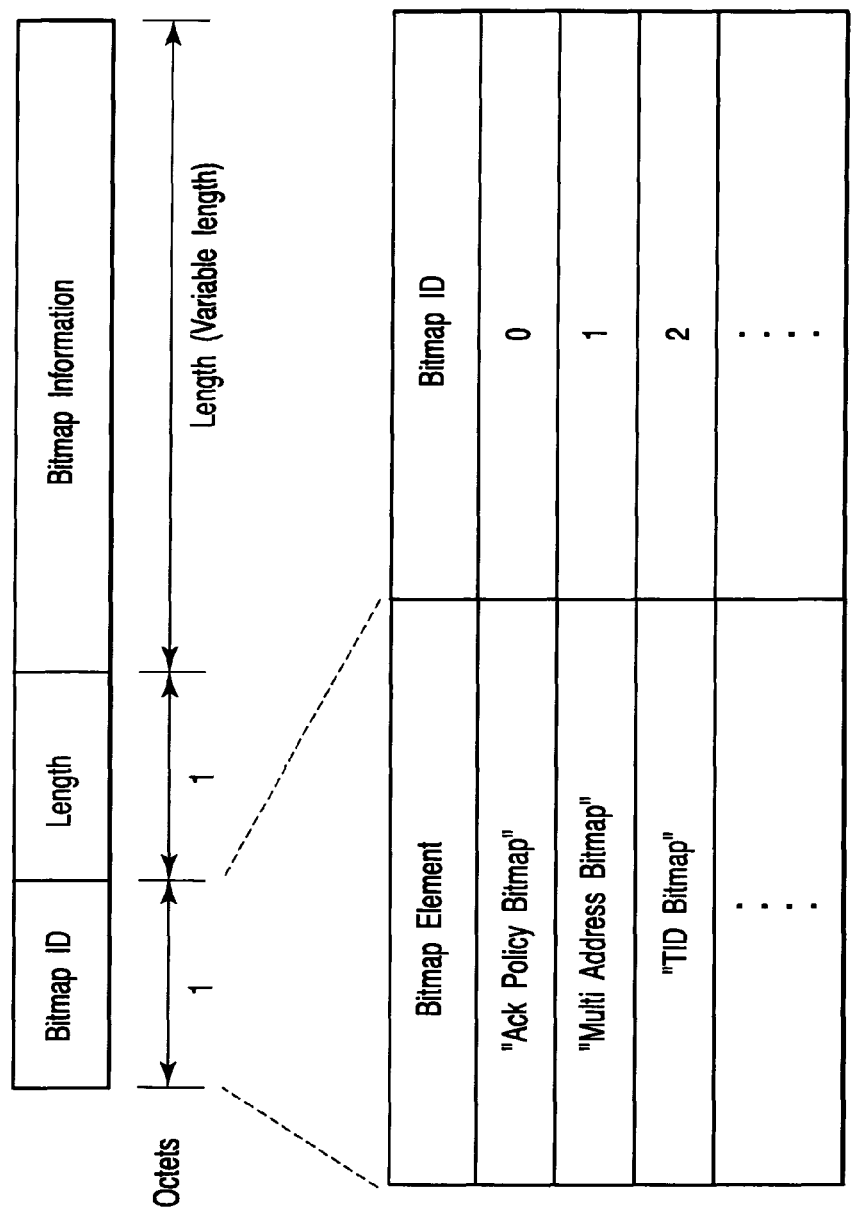
FIG. 12 is a view showing an example of "Bitmap Information" format.
Figure 13:
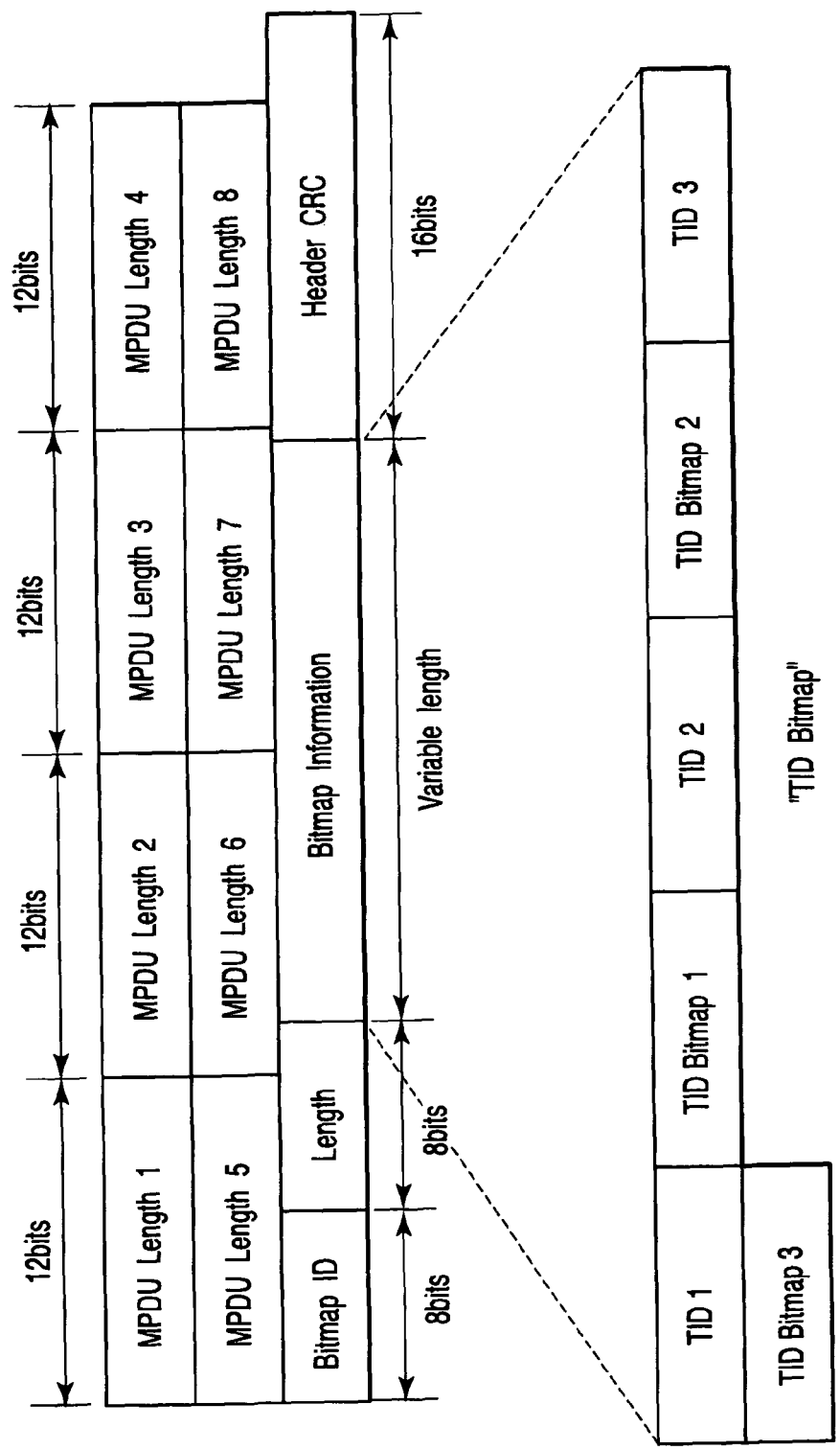
FIG. 13 is a view showing how to use Bitmap Information.

If a "Bitmap Information" field as shown in FIG. 12 is used as the format of the "TID Bitmap", the "Number of TIDs" field may also be omitted. The length of the "TID Bitmap" field in the MAC super frame header corresponds to the maximum number of MPDUs which can be aggregated. Since, however, both the transmitting and receiving sides recognize the maximum number of aggregations in advance through negotiation, the receiving side can also determine the length of the "TID Bitmap" field. In an example shown in FIG. 13, MPDUs having three types of priorities are aggregated in a MAC super frame header in which the maximum number of aggregations is eight, the length of a "TID" field in the MAC super frame header is one octet as a fixed length, and the length of a "TID Bitmap" field is also one octet (the maximum number of aggregations is eight). Accordingly, the length of a "Bitmap Information" field (the value in units of octets described in a "Length" field) is six octets. An identifier for the "TID Bitmap" is described in a "Bitmap ID" field, and the number is 2 in the example shown in FIG. 12. However, the number is of course not limited to 2.

Figure 14:
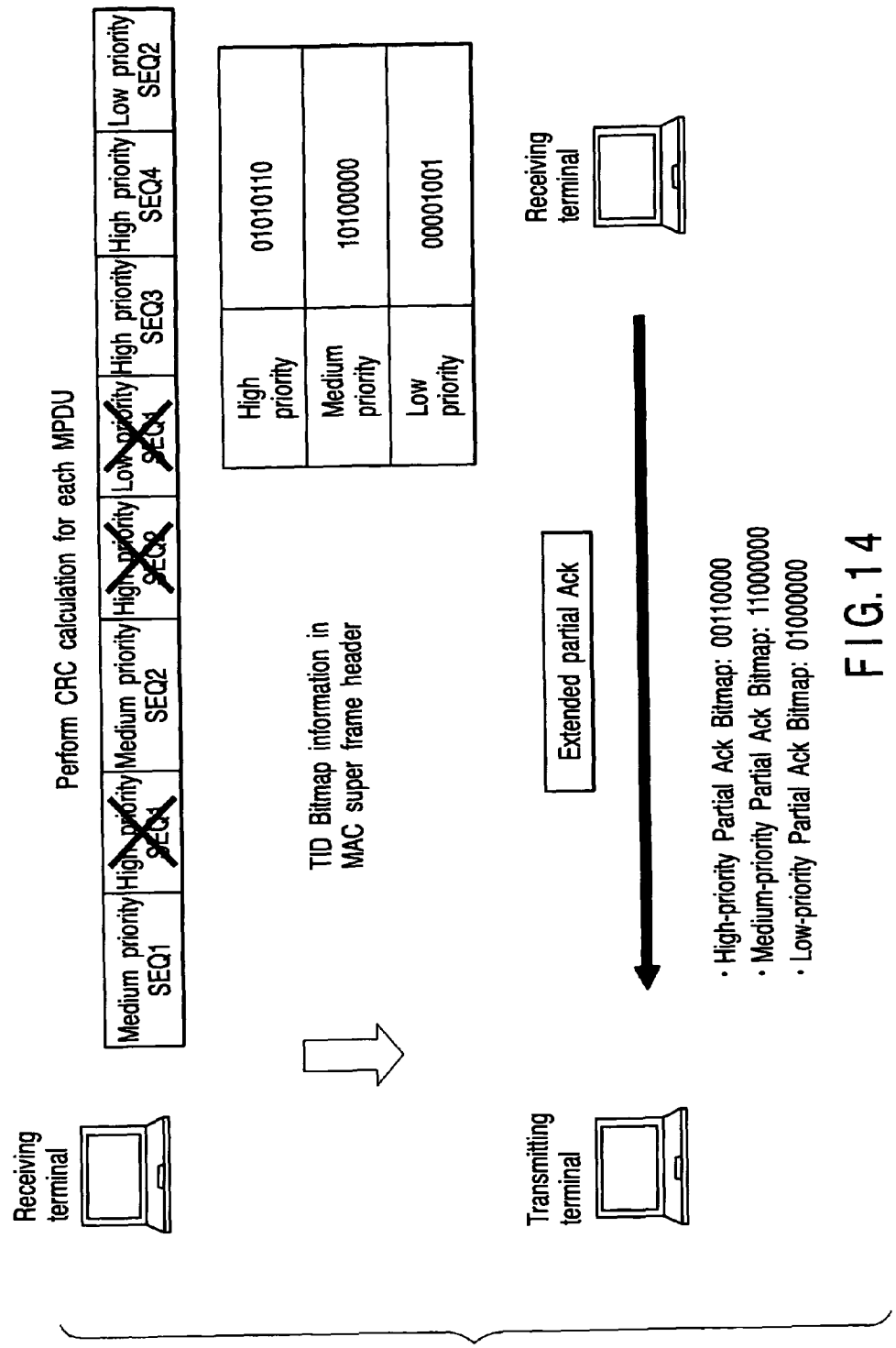
FIG. 14 is a view for explaining CRC errors and determination of priorities.

FIG. 14 shows the flow of communication using a MAC super frame obtained by extending a "TID Bitmap" field, and a Partial Ack obtained by extending a Partial Ack Bitmap for each priority. As shown in FIG. 14, when MPDUs having a plurality of priorities are aggregated in a MAC super frame, identification information indicating the position where each priority is present is described in a "TID Bitmap" field of the MAC super frame header. In the example shown in FIG. 14, the logic is so determined that "1 indicates the presence". However, implementation by negative logic is of course also possible. A MAC super frame receiving terminal performs header CRC calculation of the MAC super frame header, and, if the header is not an error, executes CRC calculation of each aggregated MPDU. Also, a Partial Ack Bitmap for each priority can be easily formed by using the "TID Bitmap" in the MAC super frame header. When a Partial Ack Bitmap for each priority is to be formed in the example shown in FIG. 14, it is determined from the "TID Bitmap" that four high-priority MPDUs exist. In addition, the two forward MPDUs are found to be errors by CRC calculations, so the bitmap configuration is "00110000". The length of a Partial Ack Bitmap is designated in units of octets. Consequently, in the example shown in FIG. 14, the four forward bits form information indicating the reception status. The four backward bits carry no special significance.

When a Partial Ack obtained by extending a Partial Ack Bitmap for each priority is received by a MAC super frame transmitting terminal, a procedure such as deletion of a MAC frame from a retransmission subqueue prepared for each priority can be performed in parallel, so more efficient processing can be realized.

Third Embodiment 1-3. Frame Aggregation Implementation (Sliding Window for Each Priority) in HCCA When a Partial Ack frame having a Partial Ack Bitmap for each priority is received, MAC frames stored in a subqueue prepared for each priority are deleted from the queue. As shown in FIG. 15, when MAC frames are stored in high-priority and medium-priority subqueues, MAC frames correctly transmitted to the destination are deleted by referring to a Partial Ack Bitmap for each priority. Assume that MPDUs in a MAC super frame are divisionally aggregated for each priority, and frames having high priority are packed forward. In this case, the contents of the Partial Ack Bitmap are interpreted from the number of MAC frames stored in a subqueue for each priority, and MAC frames having each priority are deleted from a subqueue.

Figure 16:
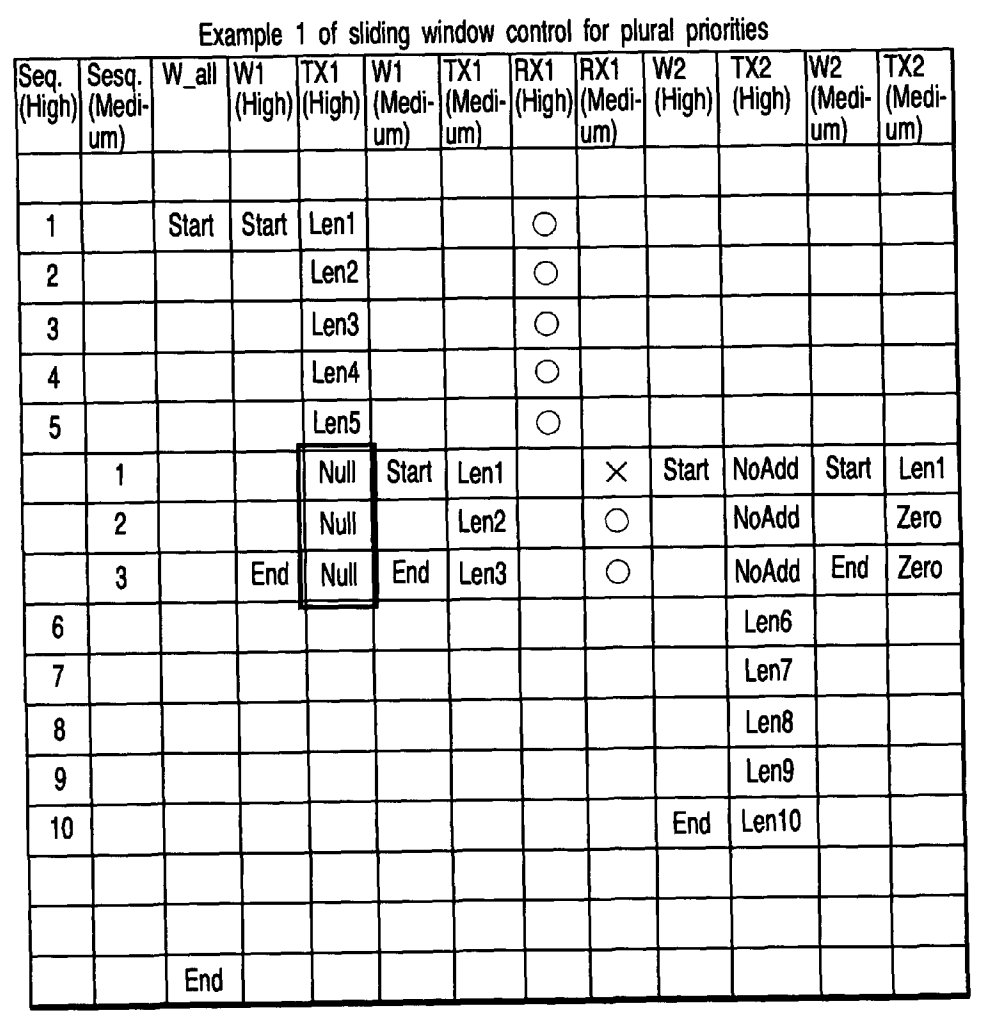

Although sliding window control is performed for each priority, cases as shown in FIGS. 16 to 19 will be explained. Each of FIGS. 16 to 19 shows a case in which two types of MPDUs having high and medium priorities are aggregated in a MAC super frame. However, the number of priorities is not limited when the present invention is practiced. Referring to FIGS. 16 to 19, W_all defines the maximum number of MAC frames which can be continuously transmitted. A window W (high) and window W (medium) at each time indicates the maximum number of MPDUs which have a certain priority and can be aggregated at once. Windows slide backward in accordance with the status of a Partial Ack Bitmap. Also, FIGS. 16 to 19 are based on the assumption that the maximum number of MPDUs which can be aggregated in a MAC super frame is eight regardless of the priority. Furthermore, FIGS. 16 and 17 illustrate sliding window control when the receiving side has one physical buffer, and FIGS. 18 and 19 illustrate sliding window control when a plurality of physical buffers are prepared on the receiving side in one-to-one correspondence with priorities. Preparing a plurality of physical buffers in one-to-one correspondence with priorities has the advantage that processes can be executed in parallel in a receiver. If a plurality of receiving buffers are present in one-to-one correspondence with priorities, a MAC super frame transmitting terminal determines a window W in accordance with the receiving buffer size of each priority of the destination terminal. The present invention is not limited to any specific negotiation method for determining the window size.

Referring to FIGS. 16 to 19, "Null" means that no frame to be aggregated is present in the main queue. "Zero" means that the last transmitted frame is correctly received. "NoAdd" means that regardless of whether a corresponding frame is present in the main queue, no new frame can be packed in relation to the maximum number of frames which can be aggregated in one MAC super frame.

First, sliding window control when the MAC super frame receiving side has only one physical buffer will be explained below on the basis of examples shown in FIGS. 16 and 17. A window size W (for high-priority) at each time shown in FIGS. 16 and 17 is determined on the basis of a (single) physical buffer of the destination terminal. A window size (for medium-priority) changes its length in accordance with the number of aggregated high-priority frames.

Referring to FIG. 16, assume that five high-priority MPDUs and three medium-priority MPDUs are aggregated and transmitted. Since five aggregated high-priority MPDUs are smaller than a window size W1 (for high-priority), an extra space is produced, so a window size W1 (for medium-priority) can ensure a space of three MPDUs. When MPDUs having a plurality of priorities are to be aggregated, it is desirable to divide these MPDUs for each priority, and aggregate high-priority MPDUs forward. After that, on the basis of information of a Partial Ack from the destination, it is found that all the high-priority MPDUs are successfully received and the first one of the medium-priority MPDUs is an error. In W2 (for high-priority), the high-priority MPDUs undergo sliding window. However, since the first frame (the first one of the three transmitted frames) of the medium-priority MPDUs is an error, it is confirmed that two medium-priority frames are stored in the buffer of the destination terminal. Accordingly, high-priority MPDUs which can be newly aggregated are five MPDUs from Seq6 to Seq10. Since no more high-priority MPDUs can be packed, "NoAdd" is indicated. For medium-priority MPDUs, the window size is not changed, and only retransmission frame Seq1 is a target MPDU to be aggregated.

The example shown in FIG. 17 is as follows. The operation up to TX1 is the same as in FIG. 16. On the basis of a Partial Ack from the destination, it is found that the second high-priority MPDU is an error, and all the medium-priority MPDUs are successfully transmitted. If no high-priority MAC frame to be packed is present in the main queue after sliding window control is performed, the window size for the medium priority can be increased. Since three high-priority MPDUs are stored in the buffer of the receiving side, four frames including one high-priority frame for retransmission are presumably used in the (single) receiving buffer. Therefore, 8 as a window size W2 (for high-priority) minus 4 is a window size W2 (for medium-priority). In this case, the window size (for high-priority) is a fixed length. That is, four frames from Seq4 to Seq7 can be aggregated in a MAC super frame.

Retransmission control as described above is performed to aggregate MPDUs within the range indicated by W_all. Also, when additional frames are to be aggregated, high-priority MPDUs are always preferentially aggregated.

FIGS. 18 and 19 in each of which the receiver side has a plurality of physical buffers in one-to-one correspondence with priorities will be explained below. When a plurality of physical buffers are prepared, parallel processing can be performed in a wireless communication apparatus. In this case, a MAC super frame transmitting terminal is notified of the buffer size of the receiving side for each priority, and the transmitting side determines the window size W for each priority. In FIGS. 18 and 19, the reception buffer size for high-priority is 8 MPDUs, and the buffer size for medium-priority is 6 MPDUs. But this number is implementation-dependent. As indicated by TX1 (for high-priority) and TX1 (for medium-priority) in FIG. 18, assume that five high-priority MPDUs and three medium-priority MPDUs are transmitted by aggregating them in a MAC super frame. Null in TX1 (for high-priority) means that no high-priority frame for a certain destination exists. In the example shown in FIG. 18, this Null indicates that only five high-priority frames are stored in the main queue at time TX1. After MAC frames are deleted from subqueues in accordance with the contents of Partial Ack Bitmaps formed in RX1 (for high-priority) and RX1 (for medium-priority), it is found that one medium-priority frame needs to be retransmitted. After that, a window W (for high-priority) and window W (for medium-priority) at each time are slid for each priority. If frames having only one type of priority are to be aggregated in a MAC super frame, these frames can be packed to "End" of the window W at each time. However, one medium-priority frame to be retransmitted exists. At TX2 (for high-priority), therefore, seven frames from Seq. Nos. 6 to 12 are targets to be aggregated in a MAC super frame. At TX2 (for medium-priority), the total of the seven high-priority frames and the one medium-priority frame to be retransmitted reaches the maximum number of frames which can be aggregated in one MAC super frame, so no more frames are added.

As shown in FIG. 19, sliding window processing is performed after a Partial Ack is received. As a consequence, at TX2 (for high-priority), only two high-priority frames to be retransmitted are aggregated. Therefore, at TX2 (for medium-priority), six (the maximum, medium-priority buffer amount designated on the receiving side) frames from Seq. Nos. 4 to 9 can be aggregated. The number of MPDUs to be continuously transmitted is so determined that the window size W falls within the range of W_all for each priority.

Fourth Embodiment 2-1. Increase Efficiency of Block Ack Processing

Block Ack defined in the IEEE 802.11e supports efficient transmission by Selective Repeat Retransmission. FIG. 20 shows the sequence of standard immediate Block Ack procedure. As shown in FIG. 20, Block Ack transmission in HCCA is adjusted within the range of a channel use period (TXOP: Transmission Opportunity) designated by a QoS access point (HC: Hybrid Coordinator). Note that the example in FIG. 20 shows the way polling to a QSTA or downlink data transmission is performed during a CAP (Controlled Access Period). The HC shown in FIG. 20 transmits a QoS CF-Poll frame (a polling frame corresponding to QoS which the HC transmits to a QSTA to permit it to perform transmission) to QSTA 1. QSTA 1 can freely transmit frames within the range of TXOP. In FIG. 20, QSTA 1 transmits QoS Data as a target of Block Ack to QSTA 2 in a burst manner and terminates the period. After that, in TXOP period 2, the HC transmits QoS Data as a target of Block Ack to QSTA 2 at SIFS intervals in a burst manner. In TXOP period 3, QSTA 1 transmits a Block Ack Request to QSTA 2 and waits for Block Ack. In TXOP period 4, the HC transmits a Block Ack Request to QSTA 2 and waits for Block Ack.

Figure 21:
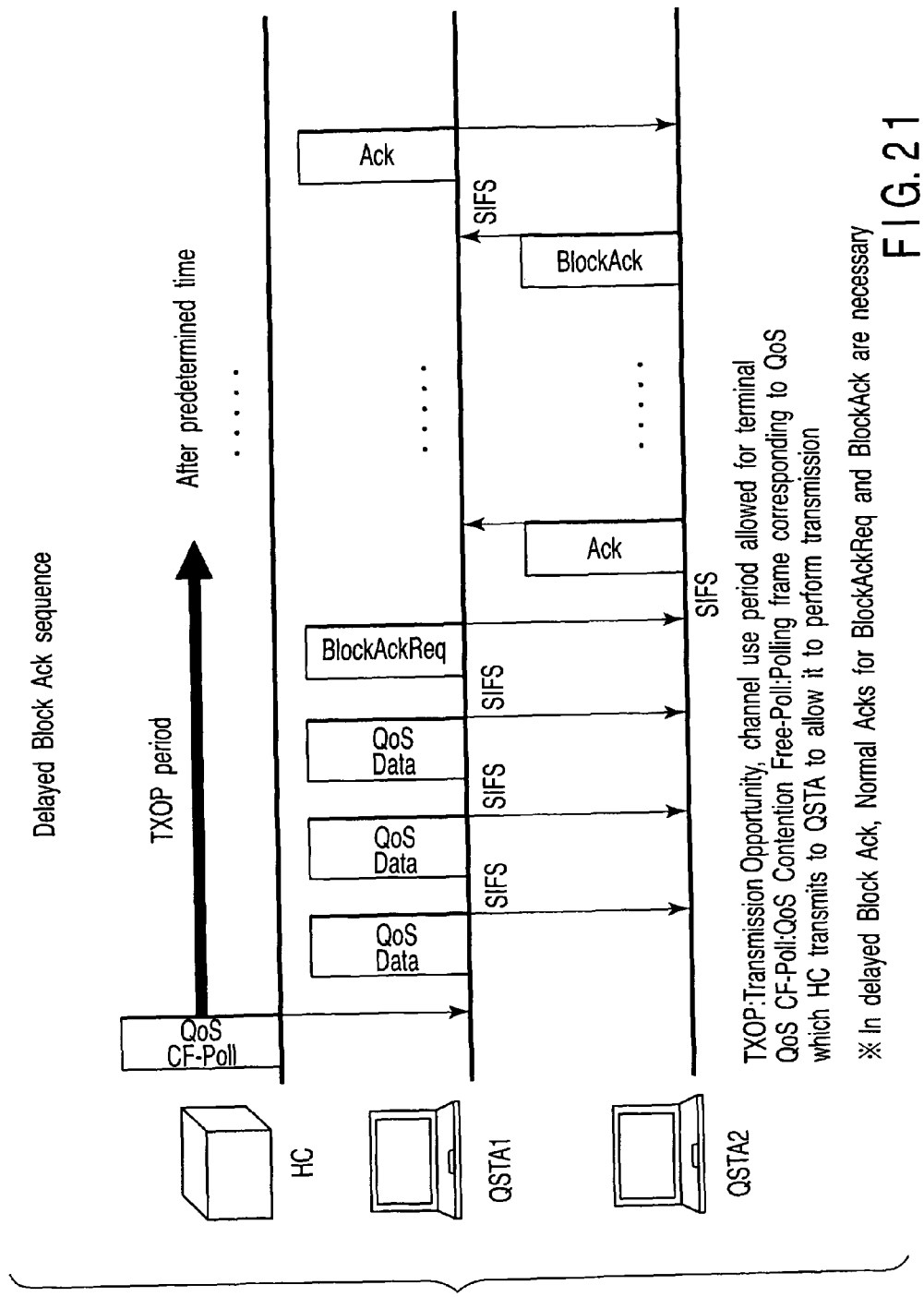
FIG. 21 is a view showing a delayed Block Ack sequence.

In the Block Ack of the IEEE 802.11e, to form a Block Ack Bitmap indicating the reception status, the receiver side must manage a maximum of 1,024 bits reception status of 64 MSDUs (MSDU: MAC Service Data Unit) for each destination and each TID (Traffic Identifier). According to the present specifications, no Block Ack Request need be transmitted immediately after QoS Data which is transmitted in a burst manner from a certain destination. Therefore, whenever a Block Ack Request is received, Block Ack is formed by checking the reception status of the corresponding destination (and TID). This generally increases the processing load on the receiver side. Consequently, it is sometimes impossible to reply Block Ack during the period of SIFS and realize transmission except for delayed Block Ack transmission as shown in FIG. 21. In delayed Block Ack, Block Ack is transmitted after a predetermined time has elapsed since a Block Ack Request is received, so the transmission efficiency obviously comes down. This is so because if Block Ack transmission executed in a transmission period of a certain terminal extends to the next TXOP period, QoS Data of Block Ack transmission from another terminal interrupts, and this complicates a mechanism for managing the reception statuses on the receiving side.

Figure 22:
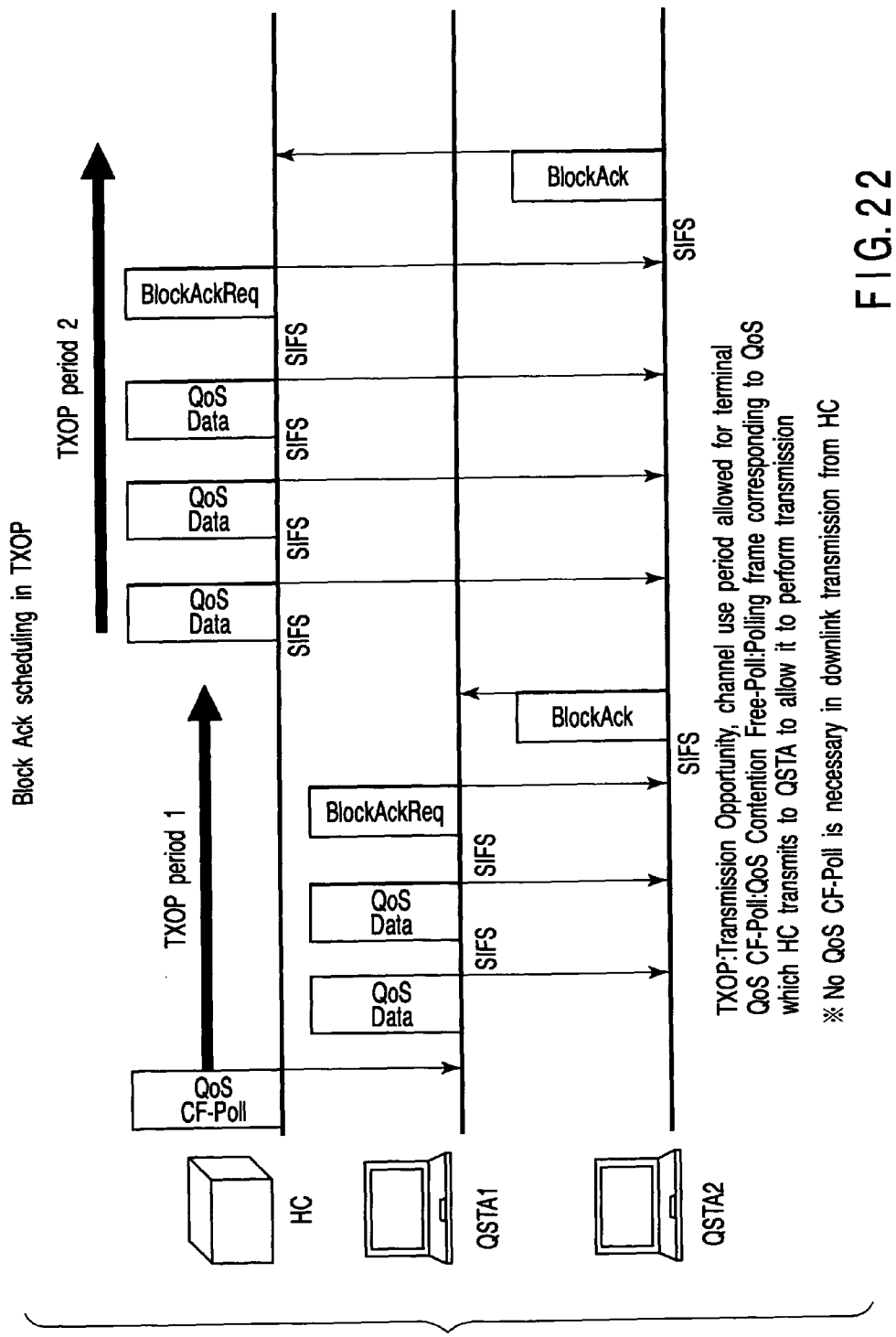
FIG. 22 is a view for explaining Block Ack scheduling in a TXOP according to an embodiment of the present invention.
Figure 23:
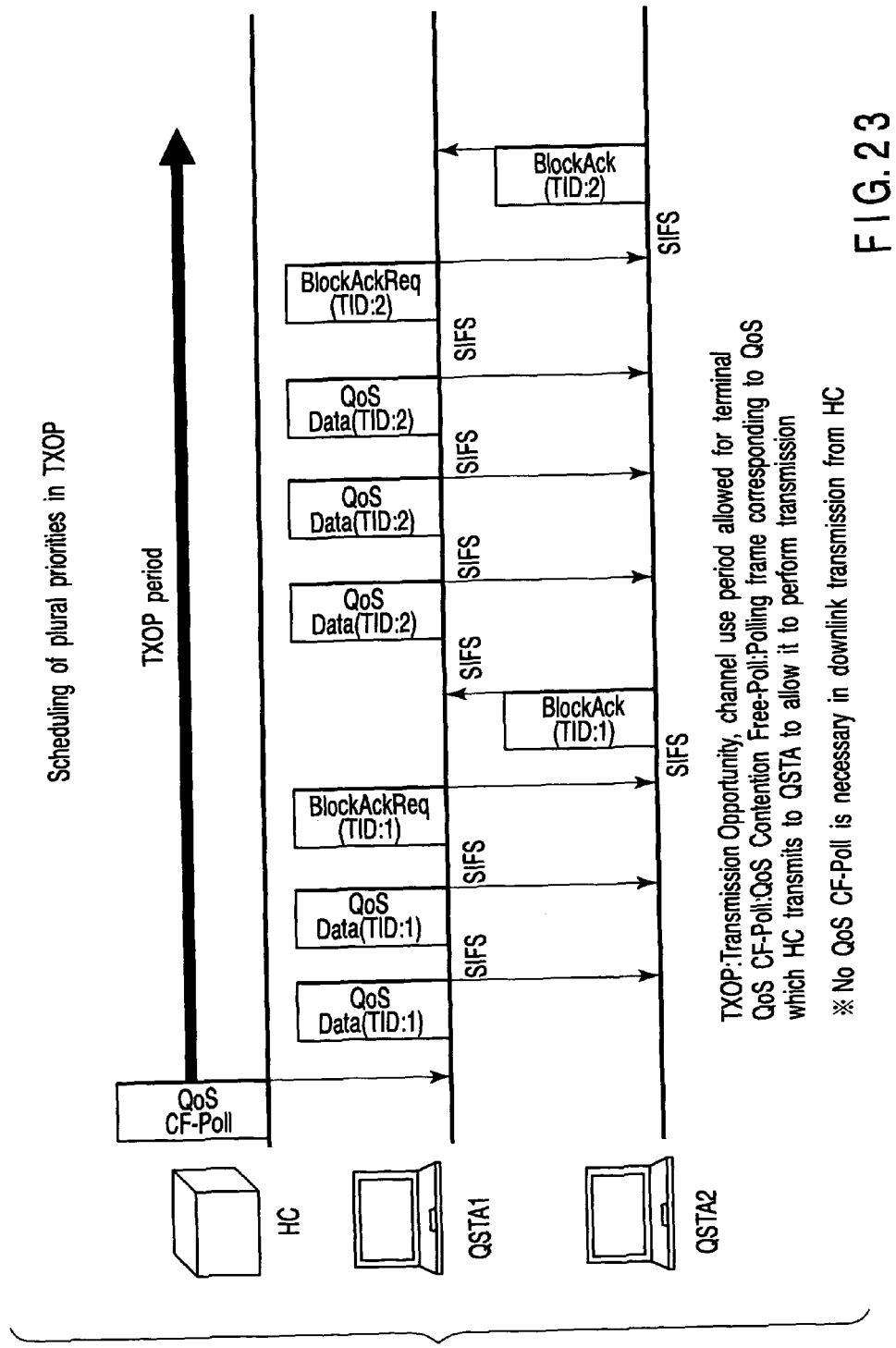
FIG. 23 is a view showing scheduling of a plurality of priorities in the TXOP.
Figure 24:
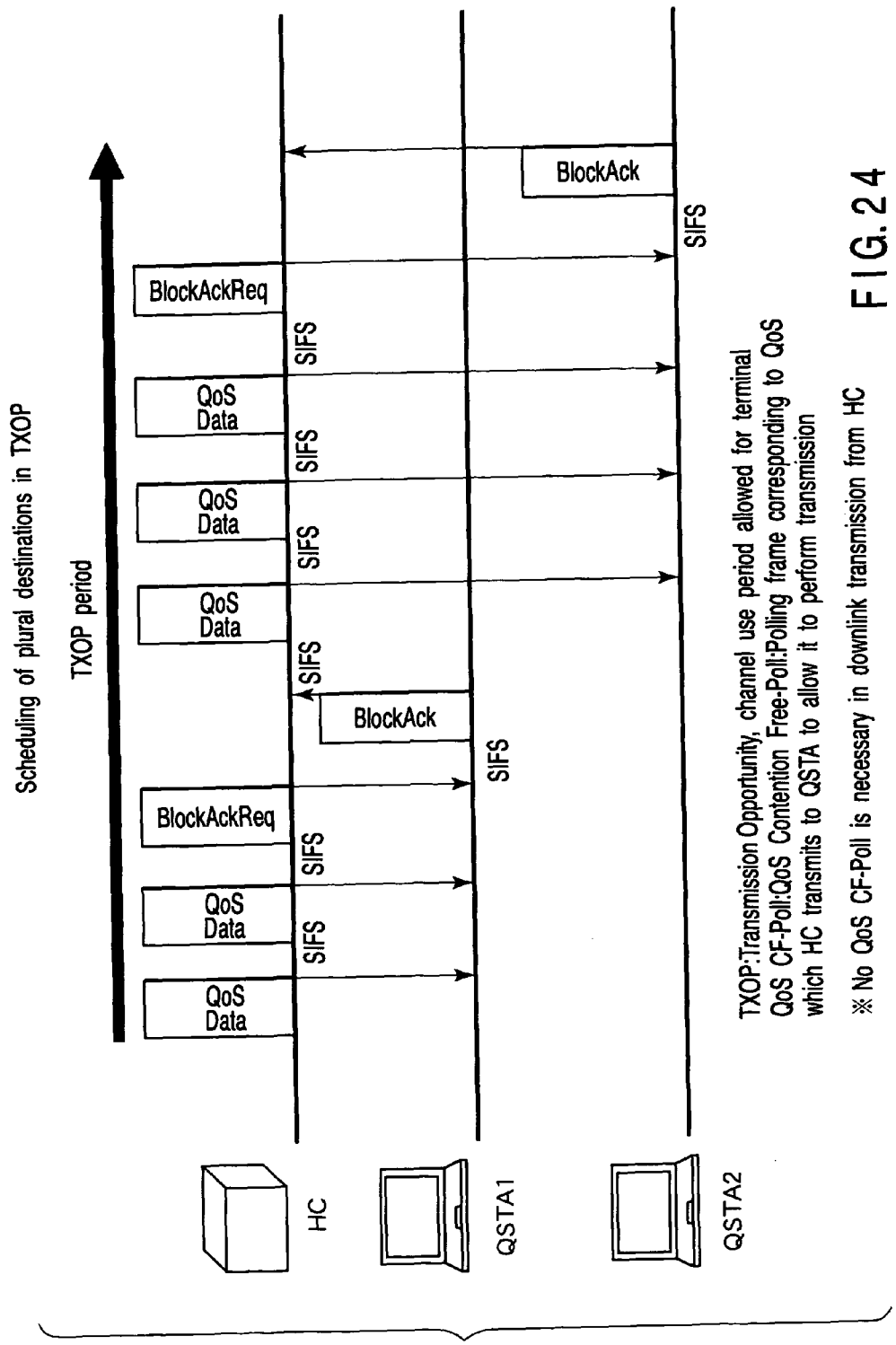
FIG. 24 is a view showing scheduling for a plurality of destinations in the TXOP.

In the first arrangement of this embodiment, therefore, a terminal which has obtained TXOP performs scheduling so that all of a series of sequences, i.e., QoS Data burst transmission, Block Ack Request transmission, and Block Ack reception, are included in the period. FIG. 22 shows a frame sequence. In the Block Ack sequence shown in FIG. 20, even when a certain TXOP period is given, a Block Ack Request is not necessarily transmitted within this TXOP period. However, in this embodiment shown in FIG. 22, scheduling is performed inside the terminal such that QoS Data burst transmission, Block Ack Request transmission, and Block Ack reception are certainly complete within the TXOP period. More specifically, the number of QoS Data to be transmitted by burst transmission is reduced, and a Block Ack Request is transmitted with a margin so that Block Ack can be reliably received. The timing of Block Ack Request transmission is appropriately calculated from the duration, number of transmitting frames, and physical transmission rate of QoS Data. In the present invention, the method of calculating the timing of Block Ack Request transmission is not limited to any specific method. Note that in a certain TXOP period, QoS Data having a plurality of priorities (TIDs) can be transmitted in a burst manner. Even in this case, as shown in FIG. 23, frame transmission scheduling is so performed as to be able to receive Block Ack of each TID within the period of TXOP by, e.g., limiting the number of QoS Data to be transmitted by burst transmission. In addition, as shown in FIG. 24, Block Ack transmission can be performed for a plurality of destinations in the TXOP period. The transmitting terminal performs frame transmission scheduling in this case as well, so as to be able to receive Block Ack from each destination within the TXOP period. If only a time during which one QoS Data can be transmitted but no Block Ack Request can be transmitted remains, Block Ack data transmission to the destination (or TID) is desirably postponed to the next opportunity (TXOP).

Figure 25:
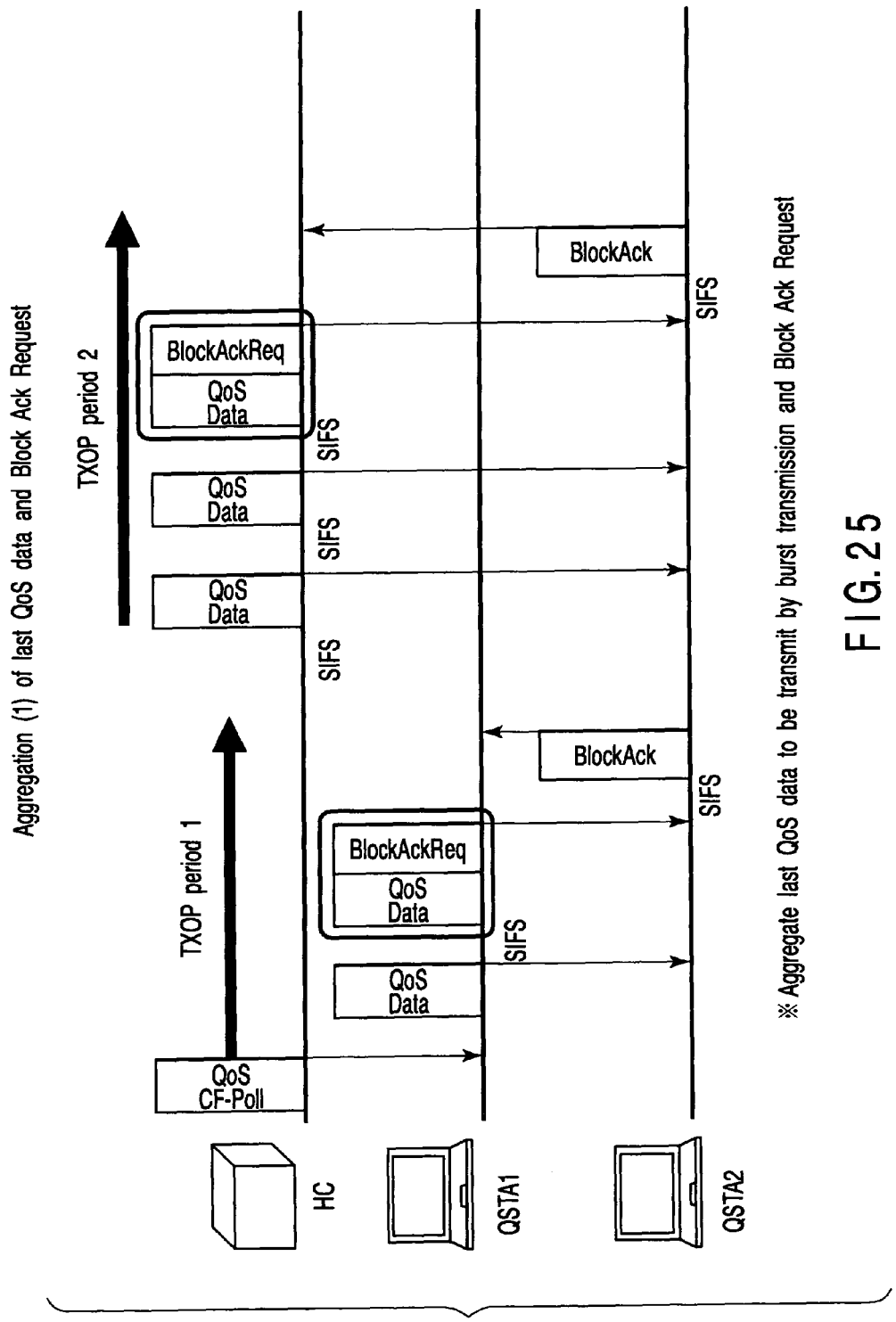
FIG. 25 is a view showing a first aggregation example of the last QoS Data and a Block Ack Request.
Figure 26:
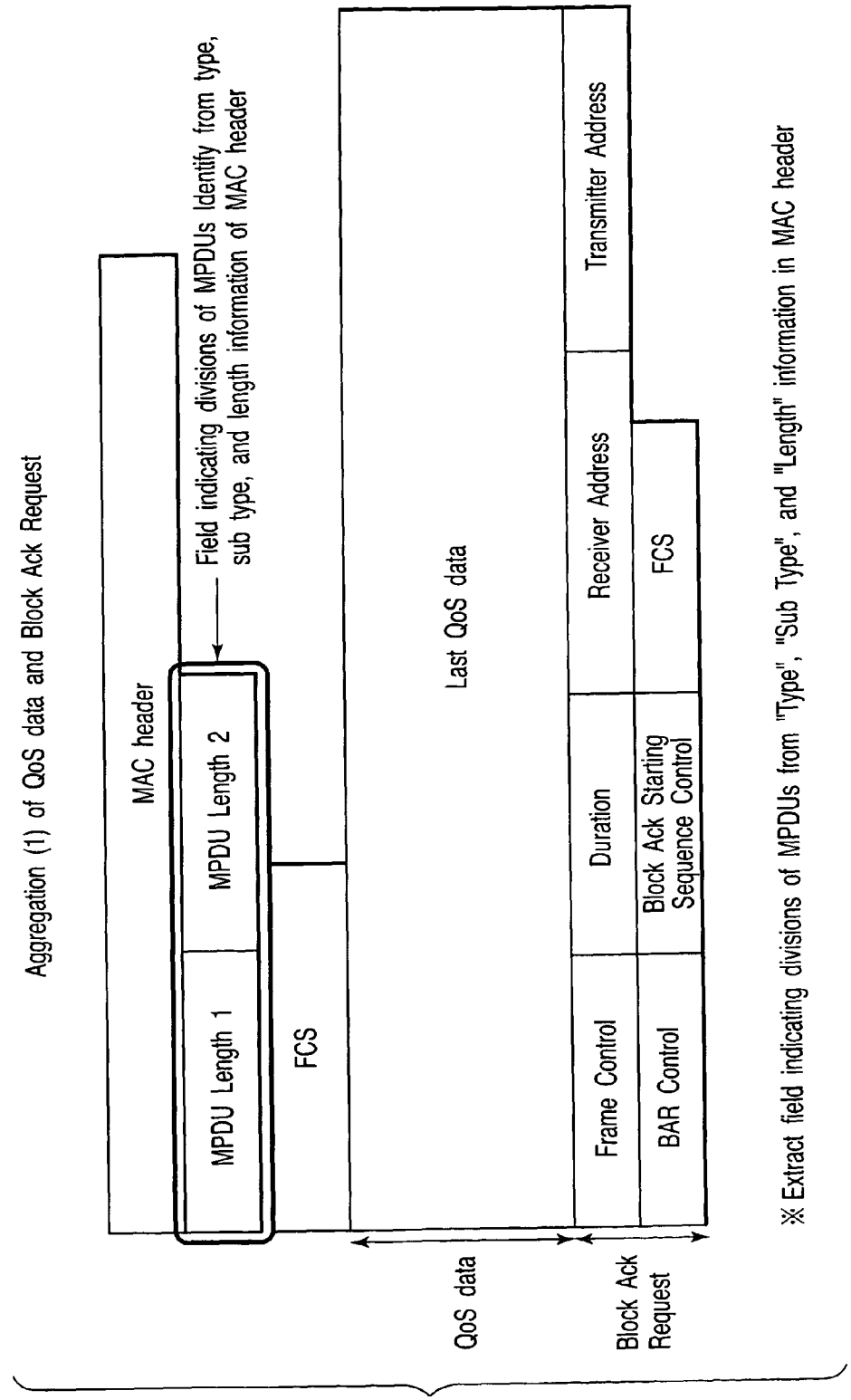
FIG. 26 is a view showing a first aggregation example of QoS Data and a Block Ack Request.
Figure 27:
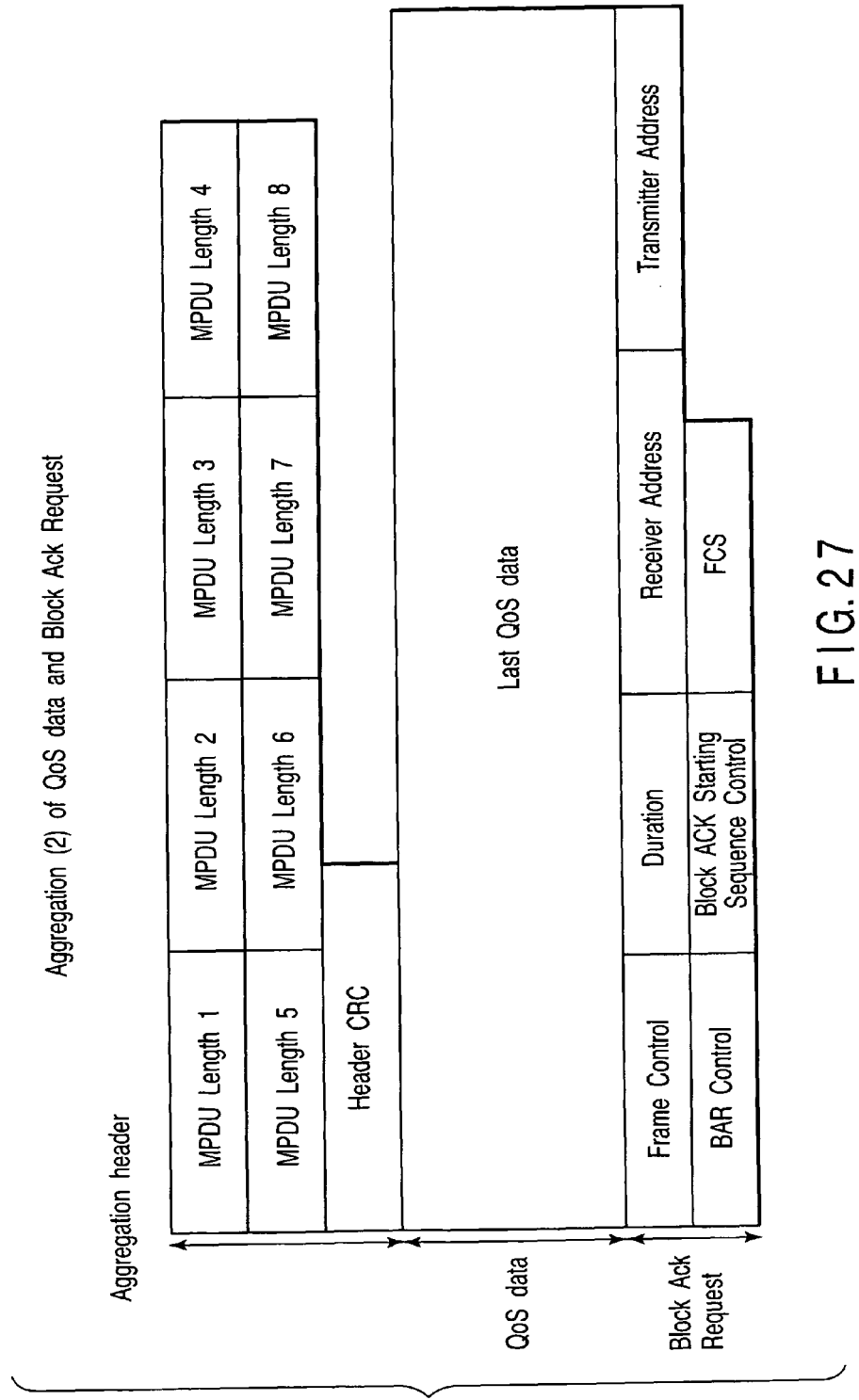
FIG. 27 is a view showing a second aggregation example of QoS Data and a Block Ack Request.
Figure 28:
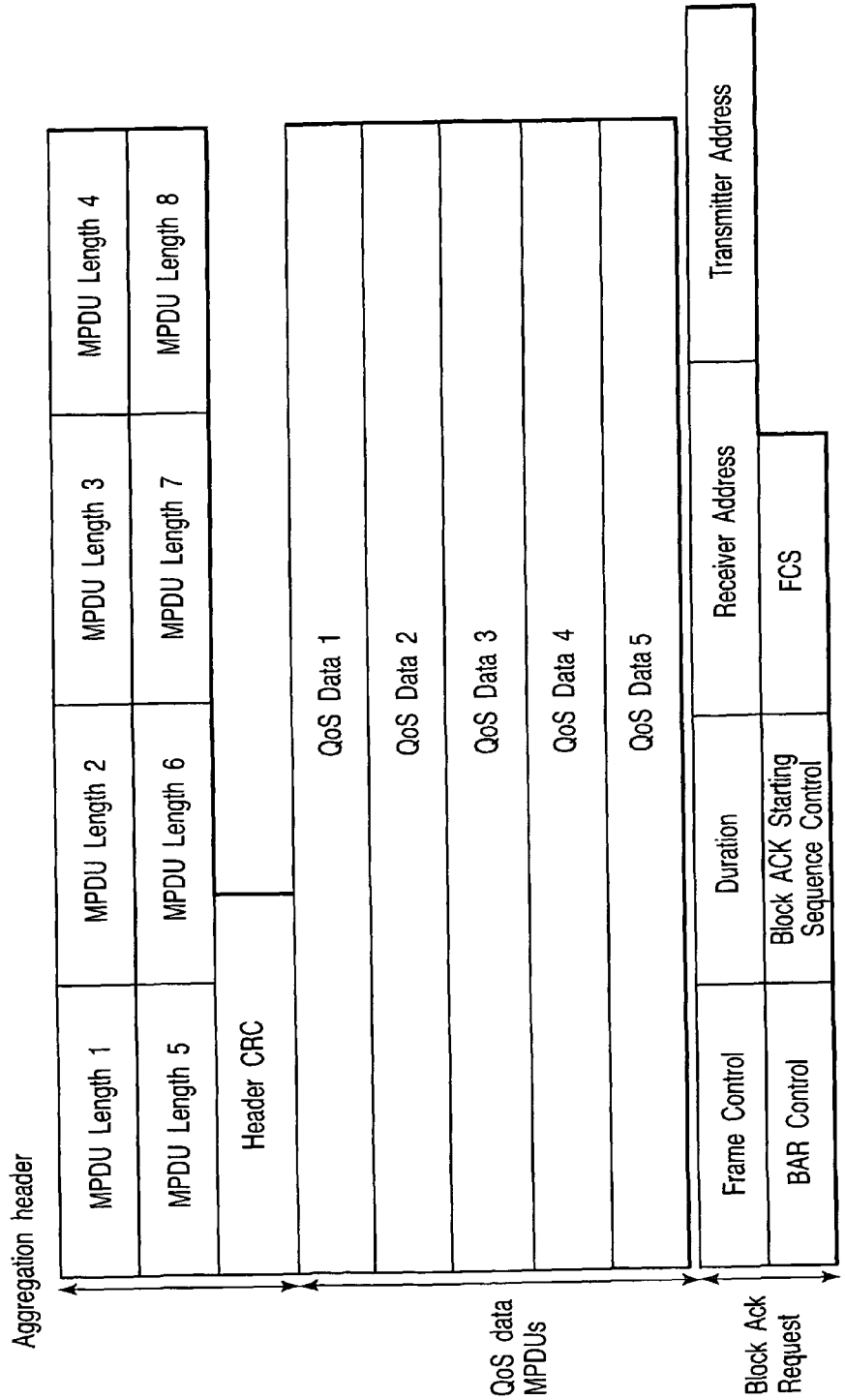
FIG. 28 is a view showing a third aggregation example of QoS Data and a Block Ack Request.

In the second arrangement of this embodiment, a Block Ack Request is transmitted by aggregating it in the last QoS Data to be transmitted by burst transmission in a given TXOP period. As shown in FIG. 25, the channel efficiency can be more effectively used by transmitting QoS Data and a Block Ack Request by aggregating them in one physical frame. FIGS. 26 and 27 show frame formats of the aggregated QoS Data and Block Ack Request. That is, FIG. 26 shows a format which includes, as a MAC payload, information indicating the divisions (lengths) of aggregated MPDUs on the basis of information such as "Type", "Sub Type", and "Length" of the MAC header of the IEEE 802.11 (QoS control information of the IEEE 802.11e is sometimes included). This field is called an aggregation field. Also, the 802.11 MAC header and an FCS (Frame Check Sequence) for the field indicating the length of the MPDU are added. Bitmap information for extending functions may also be added to the aggregation field. FIG. 27 shows an example in which an identification header indicating the lengths of aggregated MPDUs is newly formed. This header is called an aggregation header. Header CRC for calculating a header error is added to this aggregation header. If the header has an error, all aggregated frames are discarded. The aggregation header is added before the aggregated MPDU payload such as the aggregated QoS Data and Block Ack Request. Note that in the format of the aggregation header shown in FIG. 27, the maximum number of MPDUs which can be aggregated is eight. Therefore, it is also possible to aggregate a plurality of QoS Data as shown in FIG. 28, and aggregate only QoS Data as a target of Block Ack instead of a Block Ack Request. The maximum number of MPDUs which can be aggregated in one physical frame must be recognized beforehand by the transmitting and receiving terminals through some negotiation. However, a practical negotiation method is not a target of the present invention.

Figure 29:
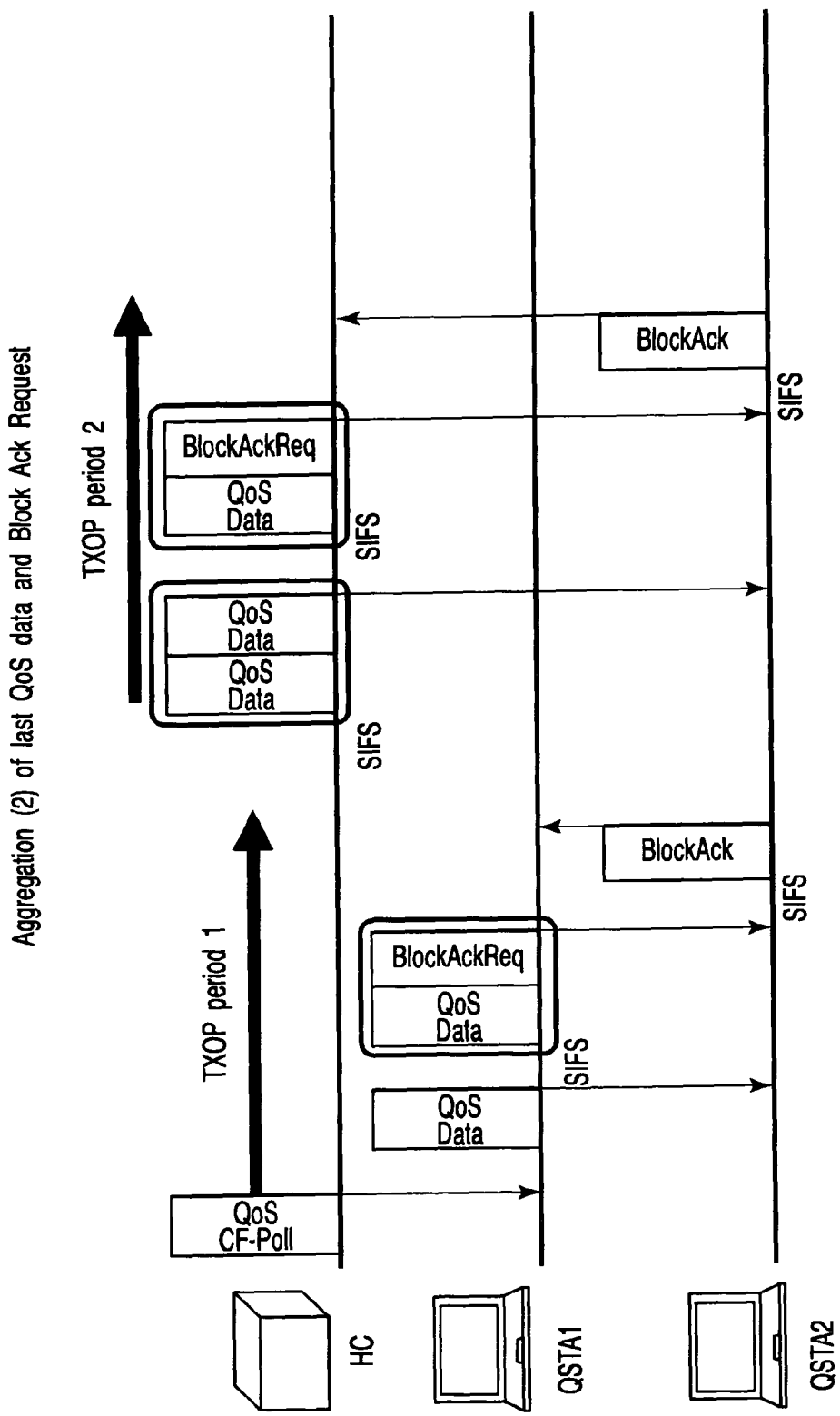
FIG. 29 is a view showing a second aggregation example of the last QoS Data and a Block Ack Request.
Figure 30:
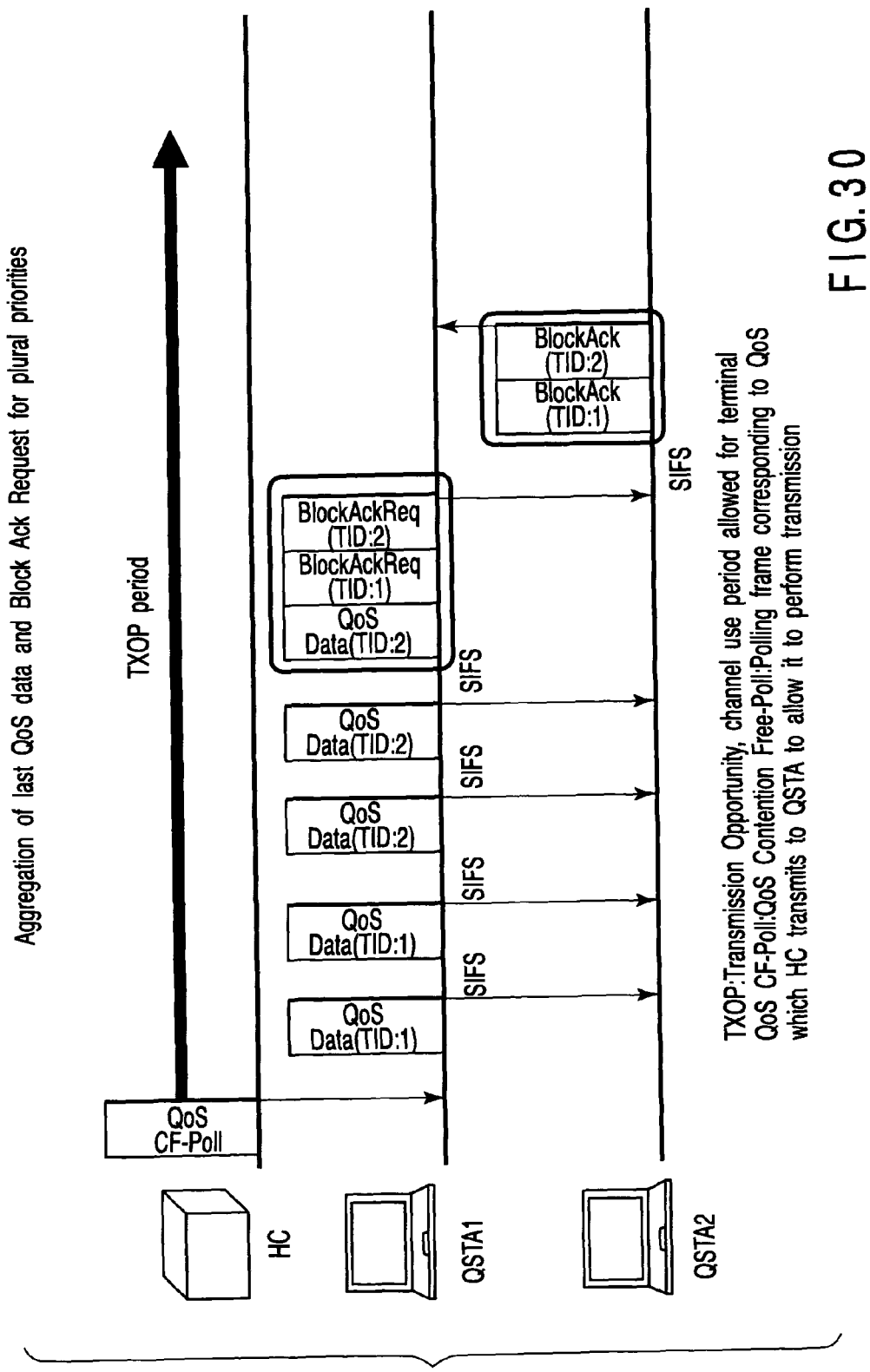
FIG. 30 is a view showing a third aggregation example of the last QoS Data and a Block Ack Request having a plurality of priorities.
Figure 31:
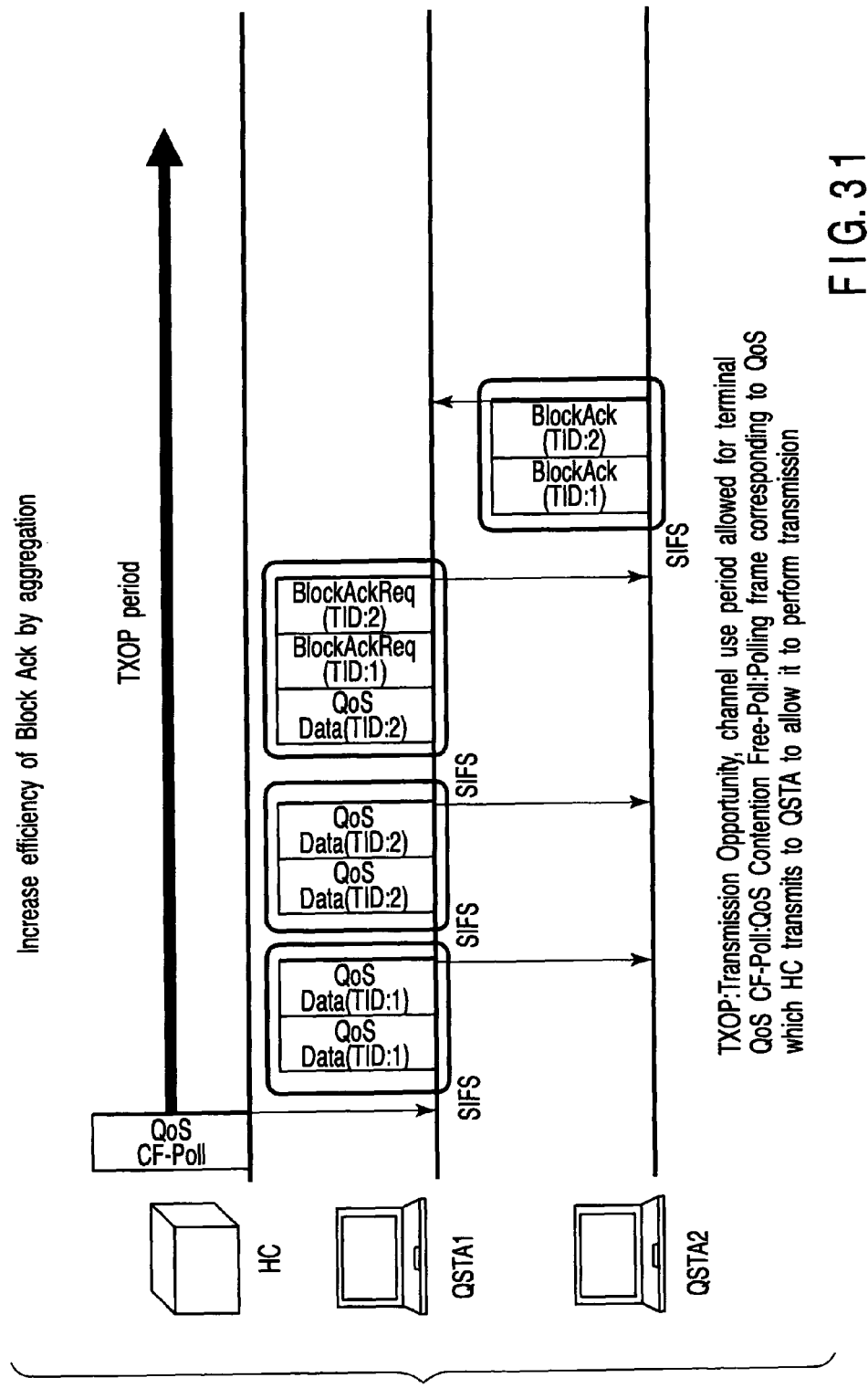
FIG. 31 is a view for explaining the way aggregation increases the efficiency of Block Ack.

As shown in FIG. 29, only QoS Data may also be aggregated in one physical frame and transmitted in a burst manner. As shown in FIG. 30, even when QoS Data having a plurality of priorities are transmitted by burst transmission in a certain TXOP period, the transmission efficiency can be increased by aggregating a Block Ack Request for a plurality of TIDs in the last QoS Data and transmitting the data. The effect further increases if the destination terminal also transmits Block Ack for each TID by aggregation. A plurality of QoS Data to be transmitted by burst transmission at SIFS intervals shown in FIG. 30 may also be transmitted by aggregating them in one physical frame as shown in FIG. 31.

The receiver side which receives QoS Data by Block Ack will be explained below.

Figure 32:
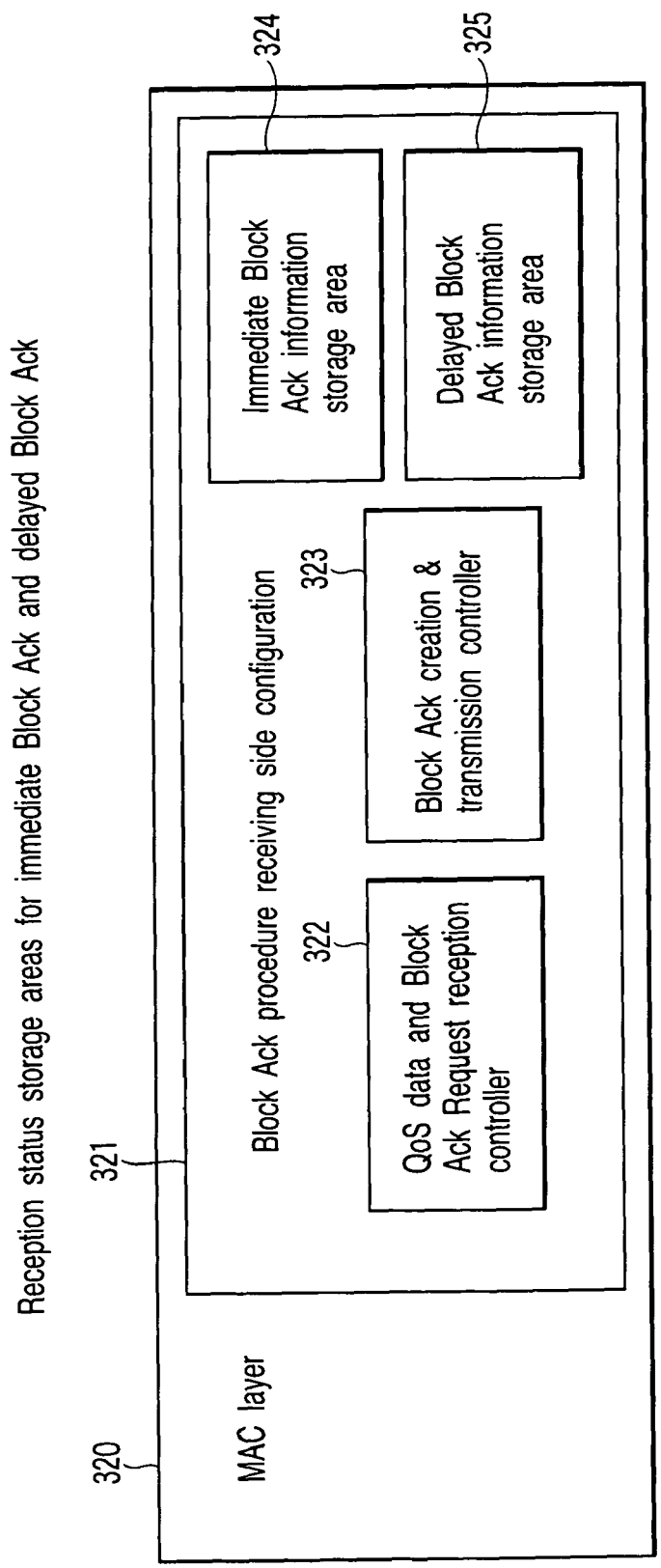
FIG. 32 is a view showing reception status storage areas for immediate Block Ack information and delayed Block Ack information.

FIG. 32 is a block diagram showing a Block Ack procedure receiving side configuration included in MAC layer of the wireless communication apparatus corresponding to the receiver side which receives QoS Data by Block Ack. The MAC layer of the receiver has a controller 322 for receiving QoS Data transmitted by burst transmission and a Block Ack Request, and a controller 323 for creating Block Ack. The receiver also has a storage area 324 for immediate Block Ack, and a storage area 325 for delayed Block Ack. This embodiment assumes that the area for immediate Block Ack is 324 relatively fast access storage, and the area for delayed Block Ack 325 is other types of storage.

When burst reception of QoS Data from a certain destination is started, the reception statuses of data frames are stored in the immediate Block Ack information storage area 324. This area can store 1,024 reception statuses for each TID. 1,024 is a value obtained by multiplying the maximum number of MSDUs (MAC Service Data Unit) which can be continuously transmitted while using a Block Ack period ("64" in IEEE802.11e) by the maximum number of fragment frames per MSDU ("16" in IEEE802.11). As shown in FIG. 22, if a Block Ack Request is transmitted from the destination whose reception statuses are stored in the immediate Block Ack information storage area 324 within the TXOP period, a Block Ack response is immediately returned. Since QoS Data from a plurality of destinations are not mixed, the load of the process of forming Block Ack for one destination can be reduced.

Also, in the example shown in FIG. 20 in which, while QSTA 2 is continuously receiving QoS Data as a target of Block Ack from the HC in a burst manner, the next TXOP period begins and QoS Data reception by Block Ack from QSTA 1 as another destination is started, if the immediate Block Ack information storage 324 area shown in FIG. 32 has no extra space, reception status information for the HC stored in this area is moved to the delayed Block Ack information storage area 325, and reception status information of the new destination (QSTA 1) is formed in the immediate Block Ack information storage area 324. After that, the receiver responds to the old destination by delayed Block Ack (the HC in FIG. 20).

In this embodiment as described above, it is possible to increase the Block Ack processing efficiency, and reduce the processing load on the receiver side in relation to Block Ack formation.

Note that in EDCA, RTS-CTS is used to notify another terminal of a channel use period used by its own terminal. However, TXOP calculations are so performed that a series of sequences, i.e., QoS Data transmission, Block Ack Request transmission, and Block Ack reception, can be performed in the duration (channel use period) of the RTS frame.

Fifth Embodiment 3-1. Frame Aggregation in EDCA

Figure 33:
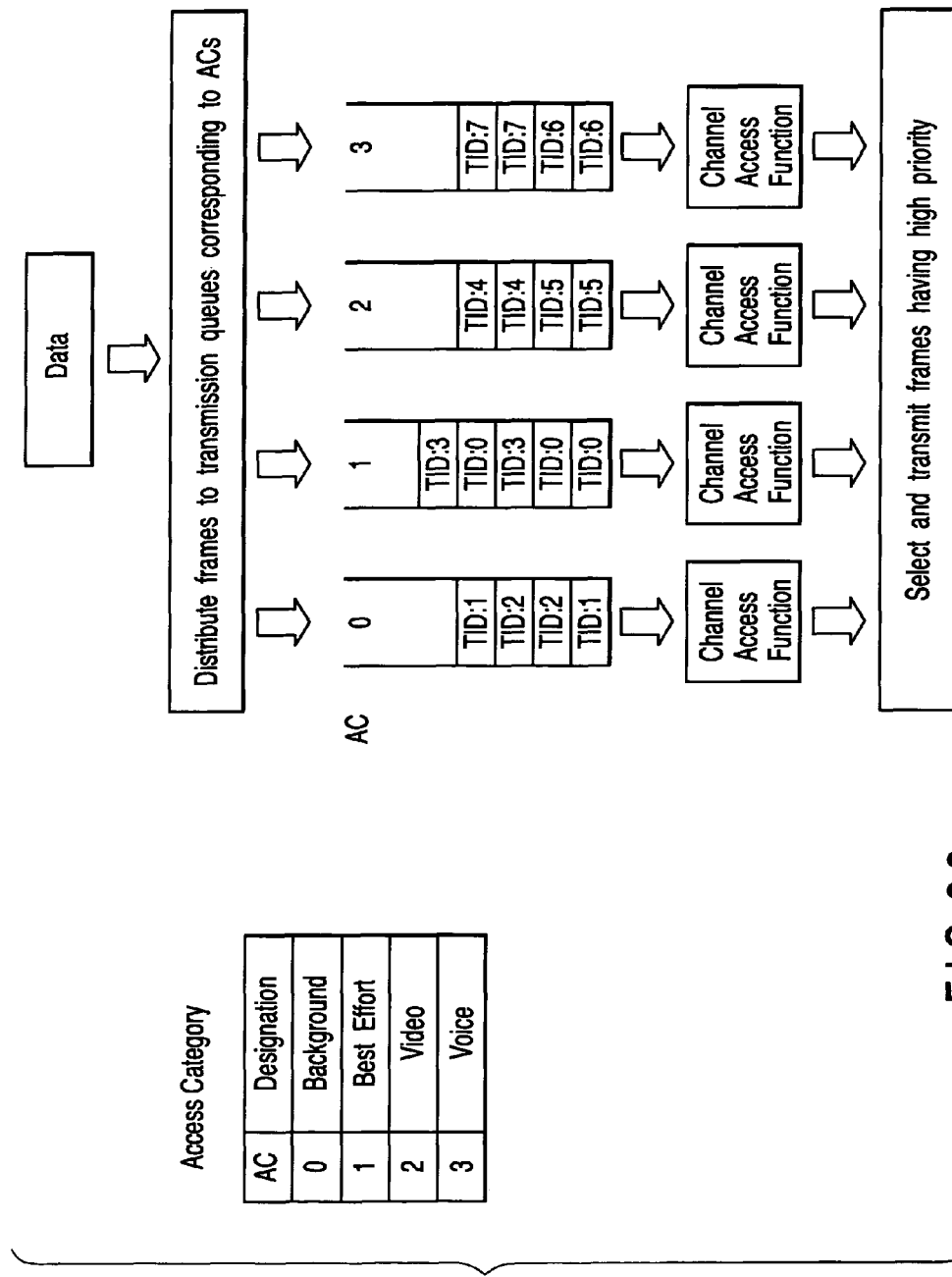
FIG. 33 is a view showing channel access in EDCA.

In EDCA (Enhanced Distributed Channel Access), a plurality of ACs (Access Categories) are formed for each priority, and these ACs perform CSMA/CA procedure in parallel. Each AC has its own IFS (AIFS: Arbitration Interframe Space) period. The higher the priority of an AC, the shorter time interval is adopted. If an internal collision occurs at a MAC layer, MAC frames of a high-priority AC are transmitted to a PHY layer preferentially, and a low-priority AC invokes a random backoff procedure again after increasing CW (contention window). FIG. 33 shows channel access in EDCA. Also, as expressed in FIG. 34, during EDCA, data from an upper layer is mapped in 0 to 7 of a TID (Traffic Identifier) in accordance with User Priority of the IEEE 802.1D. The mapped TID is distributed to ACs. As a consequence, MAC frames having a plurality of TIDs are stored in an AC.

Figure 35:
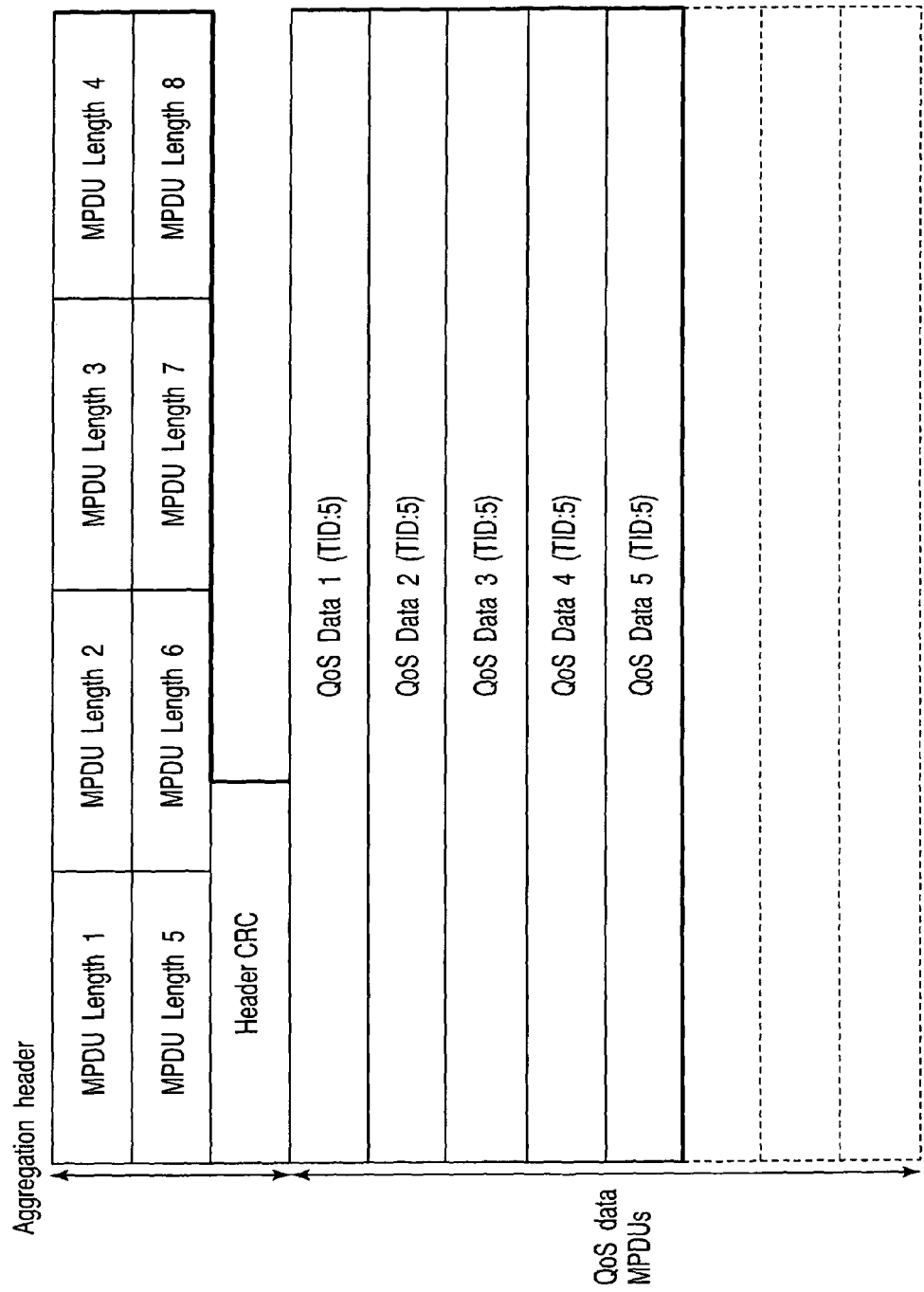
FIG. 35 is a view for explaining the problem of frame aggregation in EDCA.
Figure 36:
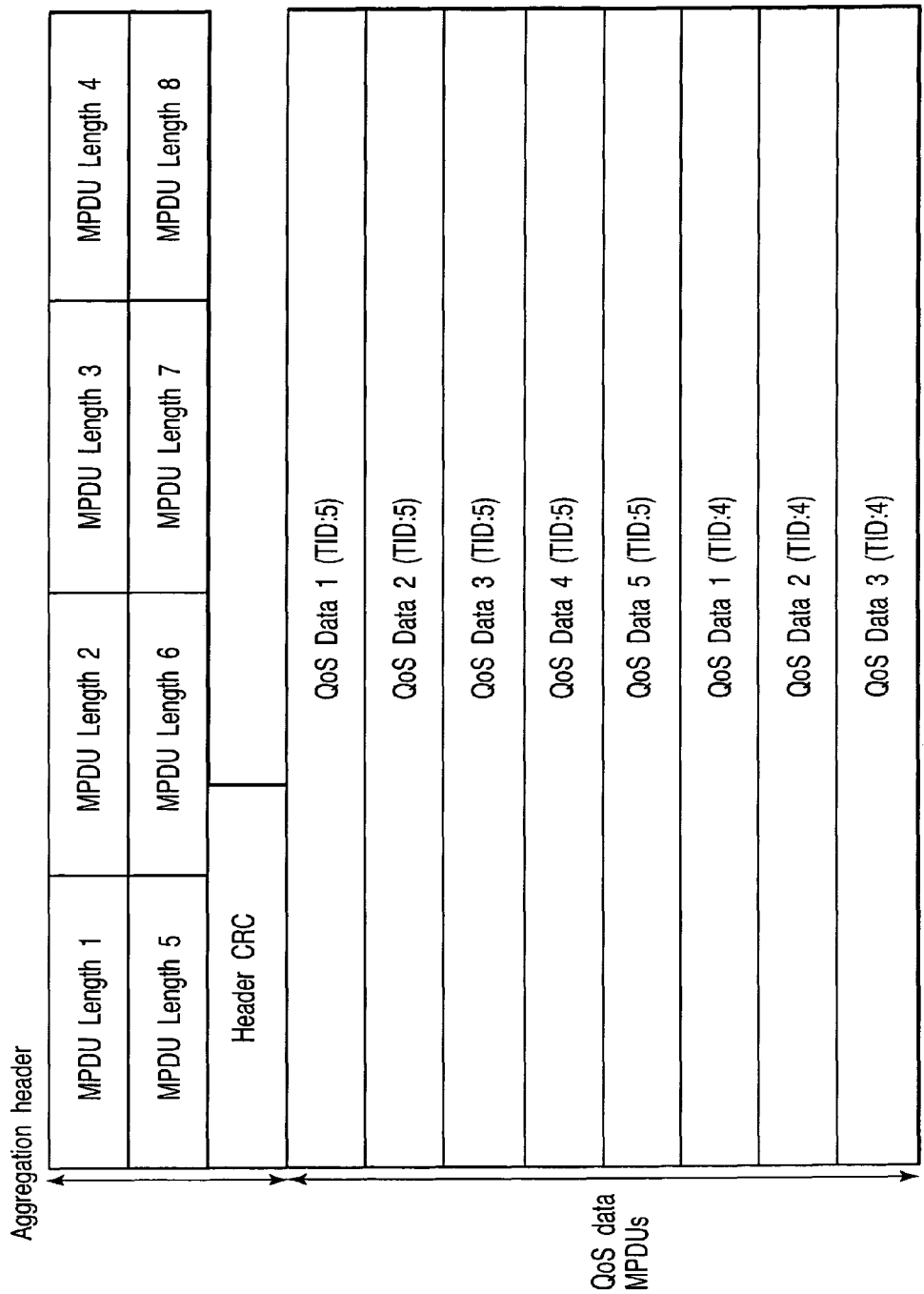
FIG. 36 is a view showing frame aggregation of a plurality of TIDs in EDCA according to an embodiment of the present invention.

As shown in FIG. 35, when a plurality of MPDUs are aggregated in one physical frame in EDCA, each MPDU is packed for each destination and each TID. This is so because EDCA is an access control method (prioritized CSMA/CA access) based on competition, and hence does not guarantee the quality of each traffic stream unlike in HCCA. That is, a MAC frame is extracted from the head of a main queue prepared for each AC, and a frame equal in destination and TID to the extracted frame is aggregated. In this case, as shown in FIG. 35, the number of MAC frames is sometimes smaller than the maximum number of MPDUs which can be aggregated in one physical frame, so the channel use efficiency may not be maximally utilized.

In this embodiment, therefore, when a certain AC obtains transmission right and transmits a data frame, MAC frames are extracted from the head of a main queue for each AC. If the number of the extracted MAC frames is smaller than the maximum number of MAC frames which can be aggregated in one physical frame, a MAC frame of another TID (in EDCA, the number of types of TIDs stored in an AC is defined to be two) is aggregated. In this case, a subqueue which stores, for the purpose of retransmission, MAC frames extracted from the main queue for each AC is desirably prepared for each TID. When a subqueue is thus prepared for each TID, sliding window control can be performed more simply.

Figure 37:
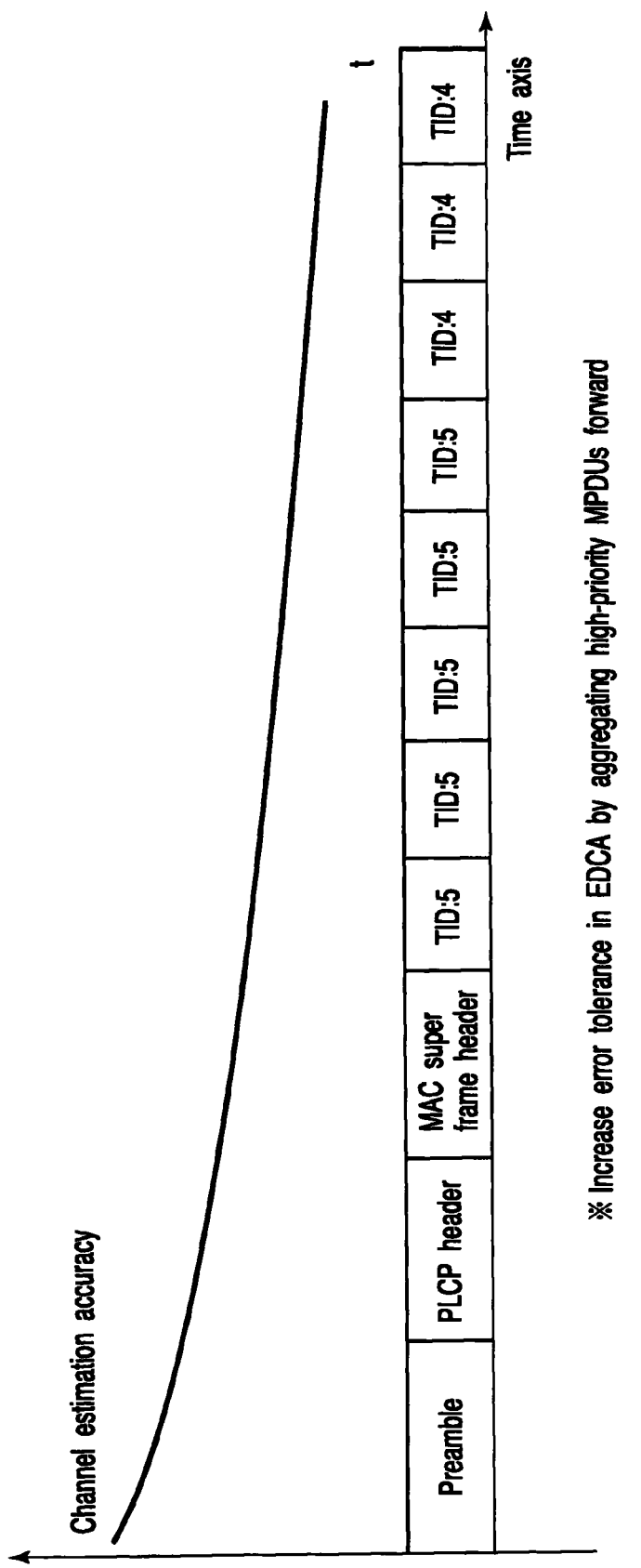
FIG. 37 is a view showing the channel estimation accuracy along the time axis when aggregation is performed for each high-priority TID.

As shown in FIG. 34, the priority changes in accordance with a TID even in the same AC. In this embodiment, therefore, a frame is aggregated by dividing it for each high-priority TID. In OFDM, channel estimation (estimation of phase and amplitude distortions of a transmission channel for each subcarrier) is realized by using a known preamble signal stored in a receiver. In a wireless LAN which is packet mode communication and in which variations of a transmission channel with time in a packet (frame) are small, the general approach is to independently perform channel estimation at the start of a preamble signal for each packet. However, if the frame length increases as in the case of an aggregated frame, the transmission channel varies with time, so the estimation result calculated when the preamble is received is sometimes not accurately reflected in the latter half of the frame (see FIG. 37). Accordingly, the error tolerance of a data frame having a high-priority TID can be effectively raised by aggregating high-priority MPDUs forward.

Also, sequence numbers are consecutively assigned to each TID. Therefore, a wireless communication apparatus for transmitting aggregated frames performs sliding window control for each TID in accordance with a partial response from the receiving side.

In the above explanation, frames having a plurality of TIDs in the same AC are aggregated. However, if no MAC frame having another TID exists in a certain AC, and if the transmission timings of a plurality of ACs internally overlap each other due to an internal collision, it is also possible to extract MAC frames having the same destination from a main queue of an AC whose priority is lower than that of the certain AC, and aggregate them in one physical frame. In this case, internal collisions occur between a plurality of ACs. Therefore, it is desirable for low-priority (and medium-priority) ACs to take random backoff by increasing contention windows after the aggregated frames are transmitted.

As described above, this embodiment can increase the effect of frame aggregation in EDCA.

In the embodiment of the present invention, FCS, which contains an IEEE32-bit cyclic redundancy check, for each MPDU can be used (as shown in FIG. 8 and FIG. 26) as a substitute for CRC information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus, comprising:
a reception device configured to receive a first physical frame from a first wireless communication apparatus, wherein, in the first physical frame, a plurality of Quality of Service (QoS) data and an immediate Block Ack request are aggregated;
an immediate type storing area to store a first bitmap indicating reception statuses of the plurality of QoS data; and
a controller configured to read out, after the immediate Block Ack request is received, the first bitmap stored in the immediate type storing area, and to generate and transmit an immediate Block Ack based on the first bitmap,
wherein the immediate Block Ack is transmitted after a Short Interframe Space (SIFS) has elapsed since the first physical frame is received, and
wherein, in response to the reception device receiving a second physical frame from a second wireless communication apparatus, the first bitmap is discarded from the immediate type storing area and a second bitmap indicating reception statuses of a plurality of QoS data included in the second physical frame is stored in the immediate type storing area.

2. The apparatus according to claim 1, wherein
the first bitmap includes a bit sequence indicating each reception status of the plurality of QoS data, according to an aggregation order of the plurality of QoS data in the first physical frame, and
the second bitmap includes a bit sequence indicating each reception status of the plurality of QoS data, according to an aggregation order of the plurality of QoS data in the second physical frame.

3. The apparatus according to claim 1, wherein
the reception statuses are stored in a plurality of the immediate type storing areas for a plurality of Traffic Identifiers (TIDs).

4. The apparatus according to claim 1, further comprising:
a delayed type storing area, and
wherein if the QoS data from the second wireless communication apparatus is received, the controller moves at least one bit of the first bitmap stored in the immediate Block Ack storage area, into the delayed type storage area, transmits an Ack response to an Block Ack Request, and transmits a delayed Block Ack after an elapse of a predetermined time.

5. The apparatus according to claim 4, wherein
the controller generates and transmits an immediate Block Ack based on the second bitmap indicating the reception statuses of the QoS data from the second wireless communication apparatus, after a Block Ack request from the second communication apparatus is received by the reception device.

6. The apparatus according to claim 1, wherein the plurality of QoS data are data that are transmitted from a same wireless communication apparatus.

7. A wireless communication method, comprising:
receiving a first physical frame from a first wireless communication apparatus, wherein, in the first physical frame, a plurality of Quality of Service (QoS) data and an immediate Block Ack request are aggregated;
storing a first bitmap indicating reception statuses of the plurality of QoS data in an immediate type storing area;
reading out the first bitmap stored in the immediate type storing area after the immediate Block Ack request regarding the plurality of QoS data is received; and
generating and transmitting an immediate Block Ack based on the first bitmap, wherein the immediate Block Ack is transmitted after a Short Interframe Space (SIFS) has elapsed since the immediate Block Ack request is received, and wherein, in response to a second physical frame from a second wireless communication apparatus being received, the first bitmap is discarded from the immediate type storing area and a second bitmap indicating reception statuses of a plurality of QoS data included in the second physical frame is stored in the immediate type storing area.

8. The method according to claim 7, wherein the first bitmap includes a bit sequence indicating each reception status of the plurality of QoS data, according to an aggregation order of the plurality of QoS data in the first physical frame, and the second bitmap includes a bit sequence indicating each reception status of the plurality of QoS data, according to an aggregation order of the plurality of QoS data in the second physical frame.

9. The method according to claim 7, wherein the reception statuses are stored in a plurality of the immediate type storing areas for a plurality of Traffic Identifiers (TIDs).

10. The method according to claim 7, further comprising:

saving the reception statuses of the first bitmap into a delayed Block Ack storage area, if the second physical frame is received;

transmitting an Ack response to the immediate Block Ack Request; and transmitting a delayed Block Ack after an elapse of a predetermined time.

11. The method according to claim 10, further comprising:

storing the second bitmap in the immediate type storing area; and generating and transmitting an immediate Block Ack based on the second bitmap after a Block Ack request from the second wireless communication apparatus is received.

12. The method according to claim 7, wherein the plurality of QoS data are data that are transmitted from a same wireless communication apparatus.

13. A wireless communication apparatus, comprising:

a reception device configured to receive a first physical frame from a first wireless communication apparatus, wherein the first physical frame includes a plurality of aggregated MAC Protocol Data Units (MPDUs);

an immediate type storing area configured to store a first Block Ack bitmap indicating reception statuses of the MPDUs; and a controller configured to read out, after the MPDUs are received, the first Block Ack bitmap stored in the immediate type storing area, and to generate and transmit an immediate Block Ack including the first Block Ack bitmap, wherein one of the MPDUs indicates an immediate Block Ack request, wherein the immediate Block Ack is transmitted after a Short Interframe Space (SIFS) has elapsed since the first physical frame is received, and wherein, in response to a second physical frame from a second wireless communication apparatus being received, the first Block Ack bitmap is discarded from the immediate type storing area and a second Block Ack bitmap, indicating reception statuses of a plurality of MPDUs aggregated in the second physical frame, is stored in the immediate type storing area.

14. The apparatus according to claim 13, wherein a last one of the MPDUs in the first physical frame is the immediate Block Ack Request, and wherein the controller generates and transmits the immediate Block Ack after the first physical frame is received.

15. The apparatus according to claim 13, wherein the plurality of MPDUs are MPDUs that are transmitted from a same wireless communication apparatus.

16. A wireless communication apparatus, comprising:

a reception device configured to receive a first physical frame from a first wireless communication apparatus, wherein, in the first physical frame, a plurality of Quality of Service (QoS) data are aggregated;

an immediate type storing area to store a first bitmap indicating reception statuses of the plurality of QoS data; and a controller configured to read out, after the physical frame is received, the first bitmap stored in the immediate type storing area, and to generate and transmit an immediate Block Ack based on the first bitmap, wherein the first physical frame includes an immediate Block Ack Request, wherein the immediate Block Ack is transmitted after a Short Interframe Space (SIFS) has elapsed since the first physical frame is received, and wherein, in response to a second physical frame from a second wireless communication apparatus being received, the first bitmap is discarded from the immediate type storing area and a second bitmap, indicating reception statuses of a plurality of QoS data aggregated in the second physical frame, is stored in the immediate type storing area.

17. A wireless communication apparatus, comprising:

a reception device configured to receive a first physical frame from a first wireless communication apparatus, wherein, in the first physical frame, a plurality of Quality of Service (QoS) data and an immediate Block Ack request are aggregated;

an immediate type storing area configured to store a first bitmap indicating reception statuses of the plurality of QoS data from the first wireless communication apparatus; and a controller configured to read out, after the immediate Block Ack request regarding the plurality of QoS data is received, the first bitmap stored in the immediate type storing area, and to generate and transmit an immediate Block Ack based on the first bitmap, wherein, in response to a second physical frame from a second wireless communication apparatus being received, first bitmap is discarded from the immediate type storing area and a second bitmap, indicating reception statuses of a plurality of QoS data aggregated in the second physical frame, is stored in the immediate type storing area.

* * * * *